United States Patent
Bauman et al.

(10) Patent No.: US 7,634,709 B2
(45) Date of Patent: Dec. 15, 2009

(54) FAMILIAL CORRECTION WITH NON-FAMILIAL DOUBLE BIT ERROR DETECTION

(75) Inventors: Mitchell A. Bauman, Circle Pines, MN (US); Eugene A. Rodi, Minneapolis, MN (US)

(73) Assignee: Unisys Corporation, Blue Bell, PA (US)

( * ) Notice: Subject to any disclaimer, the term of this patent is extended or adjusted under 35 U.S.C. 154(b) by 1680 days.

(21) Appl. No.: 09/972,490

(22) Filed: Oct. 5, 2001

(65) Prior Publication Data

US 2003/0070133 A1 Apr. 10, 2003

(51) Int. Cl.
*H03M 13/00* (2006.01)
*G11C 29/00* (2006.01)

(52) U.S. Cl. .................. 714/767; 714/772; 714/773; 714/785

(58) Field of Classification Search ............... 714/767, 714/772, 773, 785
See application file for complete search history.

(56) References Cited

U.S. PATENT DOCUMENTS

| | | | | |
|---|---|---|---|---|
| 4,030,067 A | * | 6/1977 | Howell et al. ............... | 714/758 |
| 4,413,339 A | * | 11/1983 | Riggle et al. ............... | 714/765 |
| 4,464,753 A | * | 8/1984 | Chen .......................... | 714/765 |
| 4,564,944 A | * | 1/1986 | Arnold et al. .............. | 714/759 |
| 4,862,463 A | * | 8/1989 | Chen .......................... | 714/767 |
| 5,418,796 A | | 5/1995 | Price et al. | |
| 5,490,155 A | * | 2/1996 | Abdoo et al. .............. | 714/763 |
| 5,509,132 A | * | 4/1996 | Matsuda et al. ............ | 711/3 |
| 5,633,882 A | | 5/1997 | Babb et al. | |
| 5,745,508 A | * | 4/1998 | Prohofsky ................... | 714/766 |
| 5,757,823 A | | 5/1998 | Chen et al. | |
| 5,768,294 A | | 6/1998 | Chen et al. | |
| 5,781,568 A | * | 7/1998 | Hsieh ......................... | 714/767 |
| 6,018,817 A | | 1/2000 | Chen et al. | |
| 6,574,746 B1 | * | 6/2003 | Wong et al. ................ | 714/6 |

OTHER PUBLICATIONS

Stephen B. Wicker, "Error Control Systems for Digital Communications and Storage", Prentice-Hall, 1995.*
D.C. Bossen, "b-Adjacent Error Correction," published in the Jul. 1970 issue of the IBM Journal of Research and Development, at p. 402.*
Stephen B. Wicker, "Error control Systems for Digital Communications and Storage", Prentice-Hall, 1995, pp. 116-121.*
International Search Report, dated Dec. 12, 2003.

* cited by examiner

*Primary Examiner*—Joseph D Torres
(74) *Attorney, Agent, or Firm*—Robert P. Marley; Beth L. McMahon

(57) ABSTRACT

Error correction and error detection related to DRAM chip failures, particularly adapted server memory subsystems. It uses ×4 bit DRAM devices organized in a code word of 128 data bit words and 16 check bits. These 16 check bits are generated in such a way as to provide a code capable of 4 bit adjacent error correction within a family (i.e., in a ×4 DRAM) and double bit non-adjacent error detection across the entire 128 bit word, with single bit correction across the word as well. Each device can be thought of as a separate family of bits, errors occurring in more than one family are not correctable, but may be detected if only one bit in each of two families is in error. Syndrome generation and regeneration are used together with a specific large code word. Decoding the syndrome and checking it against the regenerated syndrome yield data sufficient for providing the features described.

15 Claims, 16 Drawing Sheets

| RAM X | | | | |
|---|---|---|---|---|
| 3 | 2 | 1 | 0 | |
| 1 | | | | S3 |
| | 1 | | | S2 |
| | | 1 | | S1 |
| | | | 1 | S0 |
| 1 | 1 | | | D5 |
| 1 | | 1 | | D4 |
| 1 | | | 1 | D3 |
| | 1 | 1 | | D2 |
| | 1 | | 1 | D1 |
| | | 1 | 1 | D0 |
| | 1 | 1 | 1 | T3 |
| 1 | | 1 | 1 | T2 |
| 1 | 1 | | 1 | T1 |
| 1 | 1 | 1 | | T0 |
| 1 | 1 | 1 | 1 | Q0 |
| 0 | 0 | 0 | 0 | NO ERR |

Table 10 – RAM Error Definition

|     | ECC 0 | ECC 1 | ECC 2 | ECC 3 | ECC 4 | ECC 5 | ECC 6 | ECC 7 | ECC 8 | ECC 9 | ECC 10 | ECC 11 | ECC 12 | ECC 13 | ECC 14 | ECC 15 |
|-----|-------|-------|-------|-------|-------|-------|-------|-------|-------|-------|--------|--------|--------|--------|--------|--------|
| 96  |       |       | 1     | 1     |       | 1     | 1     | 1     |       | 1     |        |        |        |        |        | 1      |
| 97  | 1     |       |       |       | 1     |       |       |       | 1     |       |        |        |        | 1      |        |        |
| 98  |       |       | 1     |       |       | 1     |       | 1     |       | 1     |        |        | 1      |        |        |        |
| 99  | 1     | 1     |       |       | 1     | 1     |       |       | 1     | 1     |        | 1      |        |        |        |        |
|     |       |       |       |       |       |       |       |       |       |       |        |        |        |        |        |        |
| 100 |       |       | 1     | 1     |       | 1     |       | 1     |       | 1     |        | 1      |        |        |        | 1      |
| 101 | 1     |       |       |       |       | 1     | 1     |       | 1     | 1     |        |        |        | 1      |        |        |
| 102 |       |       | 1     |       | 1     |       |       | 1     |       |       |        |        | 1      |        |        |        |
| 103 | 1     | 1     |       |       | 1     |       | 1     | 1     | 1     |       | 1      | 1      | 1      |        |        |        |
|     |       |       |       |       |       |       |       |       |       |       |        |        |        |        |        |        |
| 104 |       |       |       |       | 1     |       | 1     |       |       | 1     |        |        |        |        |        | 1      |
| 105 |       |       |       |       |       | 1     |       |       | 1     | 1     |        |        |        | 1      |        |        |
| 106 |       |       |       | 1     |       |       |       | 1     | 1     | 1     |        | 1      |        |        |        |        |
| 107 |       |       |       |       | 1     |       | 1     | 1     |       |       | 1      | 1      |        |        |        |        |
|     |       |       |       |       |       |       |       |       |       |       |        |        |        |        |        |        |
| 108 |       |       |       | 1     |       |       |       | 1     |       | 1     |        |        |        |        |        | 1      |
| 109 |       |       |       | 1     |       | 1     |       | 1     |       |       |        |        |        |        | 1      |        |
| 110 |       |       |       |       | 1     |       | 1     | 1     |       |       |        |        |        | 1      |        |        |
| 111 |       |       |       | 1     |       | 1     | 1     |       | 1     |       |        | 1      |        |        |        |        |
|     |       |       |       |       |       |       |       |       |       |       |        |        |        |        |        |        |
| 112 |       |       |       |       |       | 1     | 1     | 1     |       | 1     |        |        |        |        |        | 1      |
| 113 |       |       |       |       | 1     | 1     |       |       |       | 1     |        |        |        |        | 1      |        |
| 114 |       |       |       |       | 1     |       |       | 1     | 1     |       |        |        |        | 1      |        |        |
| 115 |       |       |       | 1     |       |       | 1     |       | 1     | 1     |        | 1      |        |        |        |        |
|     |       |       |       |       |       |       |       |       |       |       |        |        |        |        |        |        |
| 116 |       |       |       |       | 1     | 1     |       |       | 1     | 1     |        |        |        |        |        | 1      |
| 117 |       |       |       |       | 1     | 1     | 1     |       | 1     | 1     | 1      |        |        |        | 1      |        |
| 118 |       |       |       |       |       | 1     | 1     |       |       | 1     | 1      |        | 1      |        |        |        |
| 119 |       |       |       | 1     | 1     |       | 1     | 1     | 1     |       | 1      | 1      |        |        |        |        |
|     |       |       |       |       |       |       |       |       |       |       |        |        |        |        |        |        |
| 120 |       |       |       |       | 1     | 1     |       | 1     |       |       |        | 1      |        |        |        | 1      |
| 121 |       |       |       |       |       | 1     | 1     |       |       | 1     |        |        |        |        | 1      |        |
| 122 |       |       | 1     |       |       | 1     |       |       | 1     |       |        |        |        | 1      |        |        |
| 123 |       |       |       |       | 1     | 1     |       | 1     | 1     |       |        |        | 1      |        |        |        |
|     |       |       |       |       |       |       |       |       |       |       |        |        |        |        |        |        |
| 124 |       |       |       |       |       | 1     | 1     |       | 1     |       |        | 1      |        |        |        | 1      |
| 125 |       |       |       | 1     |       |       |       |       | 1     | 1     |        |        |        | 1      |        |        |
| 126 |       |       |       |       | 1     |       |       | 1     |       | 1     |        |        | 1      |        |        |        |
| 127 |       |       |       | 1     | 1     |       | 1     |       | 1     |       | 1      | 1      |        |        |        |        |

| | ECC 0 | ECC 1 | ECC 2 | ECC 3 | ECC 4 | ECC 5 | ECC 6 | ECC 7 | ECC 8 | ECC 9 | ECC 10 | ECC 11 | ECC 12 | ECC 13 | ECC 14 | ECC 15 |
|---|---|---|---|---|---|---|---|---|---|---|---|---|---|---|---|---|
| 32 | 1 | 1 |   | 1 |   | 1 |   | 1 | 1 |   | 1 |   |   |   |   | 1 |
| 33 |   | 1 | 1 | 1 |   | 1 | 1 |   |   |   | 1 |   |   | 1 |   |   |
| 34 |   |   | 1 | 1 |   | 1 | 1 |   |   |   | 1 |   | 1 |   |   |   |
| 35 | 1 | 1 |   | 1 | 1 | 1 | 1 |   |   | 1 | 1 |   | 1 |   |   |   |
| 36 | 1 | 1 |   |   |   |   | 1 | 1 | 1 |   |   |   |   |   |   | 1 |
| 37 |   | 1 | 1 | 1 |   |   |   | 1 | 1 |   |   |   |   | 1 |   |   |
| 38 |   |   | 1 | 1 |   |   |   |   | 1 |   |   |   |   | 1 |   |   |
| 39 | 1 | 1 |   | 1 |   |   |   |   | 1 |   | 1 | 1 |   |   |   |   |
| 40 | 1 | 1 |   |   | 1 | 1 |   |   |   |   |   |   |   |   |   | 1 |
| 41 |   | 1 | 1 | 1 |   | 1 | 1 | 1 |   |   |   |   |   | 1 |   |   |
| 42 |   | 1 | 1 |   |   | 1 | 1 |   |   |   |   |   | 1 |   |   |   |
| 43 | 1 | 1 |   | 1 | 1 | 1 |   | 1 |   |   |   | 1 |   |   |   |   |
| 44 | 1 | 1 |   |   | 1 | 1 |   |   |   | 1 | 1 |   |   |   |   | 1 |
| 45 |   | 1 | 1 | 1 | 1 |   |   | 1 | 1 |   |   |   |   | 1 |   |   |
| 46 |   | 1 | 1 |   |   | 1 |   |   |   |   |   | 1 |   | 1 |   |   |
| 47 | 1 | 1 |   | 1 | 1 | 1 |   |   | 1 |   |   | 1 |   |   |   |   |
| 48 | 1 | 1 |   |   | 1 |   | 1 |   |   | 1 | 1 |   |   |   |   | 1 |
| 49 |   | 1 | 1 | 1 |   | 1 | 1 | 1 |   |   | 1 |   |   | 1 |   |   |
| 50 |   | 1 | 1 |   | 1 |   |   | 1 |   |   |   |   | 1 |   |   |   |
| 51 | 1 | 1 |   | 1 | 1 |   | 1 | 1 |   | 1 |   | 1 |   |   |   |   |
| 52 | 1 | 1 |   | 1 |   |   |   | 1 |   |   |   |   |   |   |   | 1 |
| 53 |   |   | 1 |   |   |   |   | 1 |   |   | 1 |   |   | 1 |   |   |
| 54 | 1 |   | 1 |   |   |   |   | 1 | 1 |   |   |   | 1 |   |   |   |
| 55 |   | 1 | 1 |   |   |   | 1 | 1 | 1 |   |   | 1 |   |   |   |   |
| 56 | 1 | 1 |   | 1 | 1 |   |   |   |   |   |   |   |   |   |   | 1 |
| 57 |   |   | 1 | 1 | 1 | 1 |   |   |   |   |   |   |   | 1 |   |   |
| 58 | 1 |   |   | 1 | 1 | 1 |   |   |   |   |   |   | 1 |   |   |   |
| 59 |   | 1 | 1 |   | 1 | 1 |   |   |   |   |   | 1 |   |   |   |   |
| 60 | 1 | 1 |   | 1 | 1 |   | 1 | 1 | 1 |   |   |   |   |   |   | 1 |
| 61 |   |   | 1 | 1 | 1 |   | 1 | 1 | 1 |   |   |   |   | 1 |   |   |
| 62 | 1 |   | 1 |   | 1 |   | 1 |   | 1 | 1 | 1 |   |   |   |   |   |
| 63 |   | 1 | 1 |   | 1 |   | 1 | 1 |   | 1 | 1 |   |   |   |   |   |

FAMILIAL CORRECTION WITH NON-FAMILIAL DOUBLE BIT ERROR DETECTION

BACKGROUND OF THE INVENTION

1. Field of the Invention

This invention relates to correcting and detecting errors that may occur within a computer system particularly within a memory device, and more particularly to systems where a single bit correction supplemented with familial 1 through 4 bit correction and double bit word-wide detection are preferred, and even more particularly to 128 bit data words stored in 4 bit RAM devices.

2. Background Information

It is expensive to dedicate memory to error correction code (ECC) space, therefore, compromises in the desire for perfect error correction and detection are needed. For sustainable commercial viability, one must still provide the largest computer systems particularly, and other RAM using data storage systems generally, with appropriate compromises in error detection and correction. Using some ECC to make memory subsystems more reliable by providing the capability to allow a single multi-bit RAM device to fail and dynamically correcting that failure and also providing the same capability for any 1, 2, 3, or 4 bits within a 4 bit RAM family and further providing for detection of any 2 bits of non-familial error anywhere in the word is the path we chose. This capacity will correct all single-bit and in-family 2, 3, or 4 bit errors on the fly, to produce a corrected data word, and identifies as unfixed (unfixable) and corrupted those data words with any other errors or error types. It is our belief that these are the most likely errors and that therefore our selected compromise is valuable.

As RAM device densities and memory subsystem bandwidth requirements increased over time, there was more pressure on the memory subsystem designers to use multi-data-bit RAM devices to meet their requirements. But to do so jeopardizes the reliability of the memory subsystem utilizing the standard Single Bit Correction/Double Bit Detection (SBC/DBD) of the past. As RAM device geometries become smaller and device failure rates increase, data words become more susceptible to failures that affect more than one bit in the device. Also, even though single bit errors are still the most predominant failure mode of RAM devices, soft single-bit failure rates are increasing do to the shrinking of the geometries and reliability characteristics of these devices. So it becomes more important to at least detect double bit errors from multiple devices, so that data corruption can be detected and safely handled. This invention provides for that protection. Providing enhanced error detection and enhanced error correction without substantial cost increases, due to increased ratio of redundant Error Correction Code (ECC) bits versus information data bits are additional goals of this invention.

There were two main methods of handling error correction and detection in the past. The predominant one was to create multiple SBC/DBD fields across the data word, and have each bit of the RAM go to separate SBC/DBD fields. The issue with this method is the additional costs of the RAMs to support the extra check bits. For example, if you had a 128-bit data word that needed protection and this 128-bit data word was implemented using ×4 RAM devices it would take 4 groups of 8 check bits to provide the same fault coverage as the proposed invention. These check bits would be implemented in (8) ×4 RAM devices. Our invention only needs 16 check bits or 4 RAM devices, rather than the 32 when using ×4 devices. For very large memories, the extra cost of that extra RAM is significant if not commercially prohibitive.

Another method is to use 2 ECC fields with each ECC field providing 2-bit "adjacency" correction. (The word "adjacency" in this art means within the family of bits (that is, of the bits) within a given RAM device, not necessarily bits which are "next-to" each other). This method would also need 4 RAM devices to implement the 2 groups of 8 check bits, and therefore would have the same cost. However, within each of the ECC fields, not all two-bit errors across multiple devices are detected. Therefore the cost is the same, but it doesn't have the same reliability characteristics.

The multi-bit adjacent error correction or Chip Kill is merged with double bit nonadjacent error detection. This entails the ability to detect and correct failures within a single RAM device, and to further detect failures that have resulted from soft or hard errors of any single bit in any two RAM devices within the 128-bit word. No other solution has ever achieved this. A unique ECC table is used in our invention in conjunction with a specific RAM error definition table (for syndrome decode), neither of which are in the prior art.

Prior inventions did not allow for the level of reliability that is present with an error code correction feature which combines single bit error correction and multi-bit adjacent correction with double bit non-adjacent error detection, at least not with a small number of additional ECC-type bits. (ECC means Error Correcting Code and is a common abbreviation in this art).

Thus, there is a need for error correction and detection at low memory cost and high reliability, and providing familial error correction allows for capturing the most likely to occur of the multi-bit within a word errors, those that occur within a single DRAM or RAM device. Accordingly, by thinking of the problem in this way, instead of trying to correct every possible error, we have designed an inventive and low cost error detection and correction system as set forth below.

There have been similar systems in the art, but these do not have all the advantages or requirements of our invention. Perhaps the closest reference in a U.S. Pat. No. 6,018,817 issued to Chen et al., and incorporated herein by this reference in its entirety. Using same sized (×4 bit) RAM devices, the Chen '817 reference requires 12 ECC bits for each 72 data bits if a 4-bit-wide RAM is used, while our invention handles sufficient reliability needs with only 16 bits of ECC for 128 data bits using 4-bit-wide RAMS. (RAM is the generic term, which includes DRAM, and while our preferred implementation was developed on DRAM chips, other RAM devices can be used). Further, Chen '817 requires 16 ECC bits per 72 data bits if they use ×8 RAM devices. Compared to either embodiment of Chen '817, our invention seems to produce more error checking and also possibly more error correction while requiring less ECC bits.

The specific code to support the 12 ECC bit code appears to be described in U.S. Pat. No. 5,757,823, Chen '823, (also incorporated herein by this reference). The cost savings related to an additional third of savings over Chen '823 will be appreciated by those of experience in these arts. As Chen mentioned in Col 1 lines 40-52 that even a 5% savings in memory commitment for main memory is very important to computer systems.

An additional patent of interest includes Blake et al, U.S. Pat. No. 5,682,394 which shows a disablement feature, and this is also incorporated herein by this reference.

Finally, Adboo et al., U.S. Pat. No. 5,490,155, also incorporated herein by this reference, describes a system for correcting ×4 DRAM errors, Adboo, as in our invention, uses 16 check bits for a 128-bit data word. However Adboo requires that the check bits be produced by two identical parity trees for each 64 bits, wherein each parity tree has the same number of inputs, and the outputs are paired to correct up to four bit errors within a single DRAM or RAM device. Perhaps more importantly, Adboo can only detect and correct one single bit error in a word or one two adjacent-bit errors in a word, or four adjacent bit errors in a word. Adboo cannot detect two unrelated single bit errors or a single bit error outside of a familial group having up to 4 bit errors, which our invention can do. As can be clearly seen with reference to Adboo's FIG. 9A, an error in two check bits (or many of the two bits unrelated errors, actually) that are unrelated or non-adjacent, yields an uncorrectable and undetectable error. For an example of this failing of Adboo, note that the code for bit C4 is 0001 and the code for C7 is 1000. XORing these two values leads to the result 1001, which indicates that bit 0 is in error! Thus if both C4 and C7 are in error, the syndrome will indicate that bit 0 is in error, an unacceptable situation, even if such an occurrence may be a rare event, because it missed two single bit errors.

Accordingly there is a need for stronger detection and correction of errors to improve the reliability of computer system memories and to do so with a minimal amount of data. An error correction system and chip-kill type system together with double bit non-familial error detection will provide a commercially most useful solution to this technical problem.

We describe our invention with reference to the drawings in the summary and detailed description sections below, but limit its scope only by the appended claims.

BRIEF DESCRIPTION OF THE DRAWINGS

FIGS. 2A, 2B, 2C, and 2D (hereinafter referred to together as FIGS. 2A-D) form a table of error correction code binary values in accord with a preferred embodiment of the invention.

FIGS. 3A, 3B and 3C (hereinafter referred to together as FIGS. 3A-C) form a table of values identifying correctable bits in accord with the preferred embodiment of the invention using the ECC values of FIGS. 2A-D and the possible error state table of FIG. 1.

FIGS. 6B and 6A are mathematically equivalent.

SUMMARY OF THE INVENTION

A highly complex code sequence has been discovered which provides an opportunity to correct multi-bit errors within a bit family, while at the same time providing an opportunity to also detect all additional single bit errors outside of that bit family, and further providing an opportunity to detect many other multi-bit uncorrectable errors. This code requires only 16 "check" or ECC bits that are generated through the use of the inventive code for 128 bit data words, by feeding each indicated one of the 128 bits into each XOR tree of the 16 check bits indicated by the code. The same generator (or an identical one organized by the same code) regenerates the 16 check bits when a 128-bit memory word is read out of main memory and a comparison with the originally generated check bits is made by XORing the saved check bits with the output of the regenerator to produce a syndrome code. (This is the same, mathematically, as putting the 128 data bits through the same XOR tree configuration and adding in the check bit for each branch of the tree, which in practice is how we prefer to produce the syndrome because less cycle time is required). The resulting syndrome is decoded, again employing the code sequence to organize the decode gates, to identify all the correctable errors (540 of them) and to identify most conditions of uncorrectable errors, and to indicate good data if there is no detectable error or corrupted data if errors are detected but they are uncorrectable.

The code sequence can be modified by shifting bits' ECC values to other bits, so long as the ECC generator and regenerator/syndrome generator are both corrected to match the code change, and the syndrome decode is modified to compensate for the shift as well.

DETAILED DESCRIPTION OF THE PREFERRED EMBODIMENTS

The preferred component concepts and parts are described first, and then the preferred functioning of the invention is described.

Figure 1:
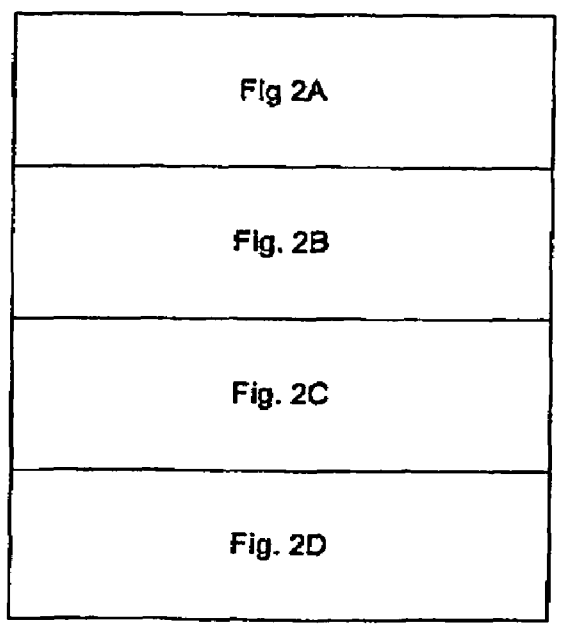
FIG. 1 is preferred embodiment table of binary values defining the possible error states and the four bit codes for them for each RAM device in the word.

Please refer first to FIG. 1 in which the RAM error definition table 10 is illustrated, having five columns, the first four of which (R) indicate the DRAM or RAM bit number for each RAM under consideration. These four bits are said to be family bits or familial, because they are within a single RAM device. In some texts this is referred to as "adjacency," but we find that term confusing since the last bit in one RAM might also be considered adjacent to the first bit in the next RAM. So, for purposes of discussion within this patent, we say that all bits within a DRAM or RAM device with be considered familial bits and those outside are not familial or are not part of the same family. We label the rows 0-16 of FIG. 1's table 10 for later reference.

Table 10 describes all possible error states (there are sixteen, including no error) in area S for each of the family of bits in RAM X, a four-bit RAM or x4 RAM device. (In a 128 bit word there are 32 such devices, RAMs 0-31, and in our preferred inventive system, there would be an additional 4 devices, making 36 such RAM X devices in total per 128-bit-data-plus-16-bit-ECC word). The column ETC indicates the error type code for each error type. Thus, an S3 indicates an error in bit 3 of RAM X, with no other errors in the family. A D2 indicates one possible two-bit, in-family error state with bits 2 and 1 of RAM X being in error. A T indicates one of the four possible three-bit in-family error states for RAM X, and the Q (Q0) indicates that all four bits are in error.

Note that the arrangement of 1's in the table 10 is arbitrary and that one of ordinary skill in this art will be able to place the fifteen 1's in other locations so that a unique table identifying all possible errors but having them in different locations would result. Any such table could be substituted for this preferred table of FIG. 1, if desired, without leaving the ambit of this invention. For example, the diagonal of 1's in the first four rows could be reversed so that column 0, row 0 has a 1, column 1, row 1 has a 1, column 2, row 2 has a 1 and row 3, column 3 as a 1, and the remainder of the table could remain the same, thus producing another possible variation of the inventions, as will be fully understood with reference to the remainder of this disclosure. This table is for consideration when assessing each family of bits (i.e. each 4-bit RAM device).

Figure 2B:
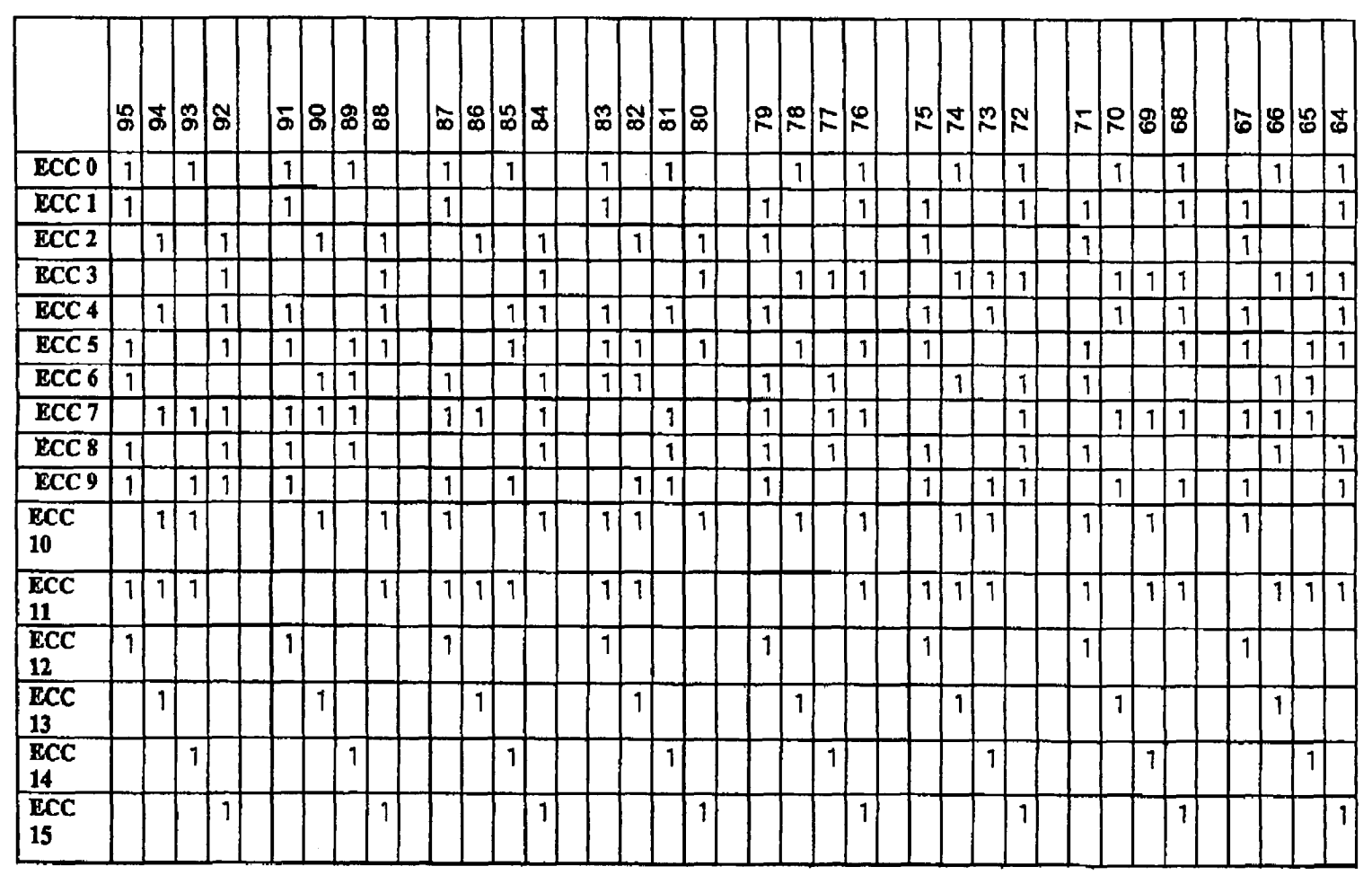
Figure 2D:
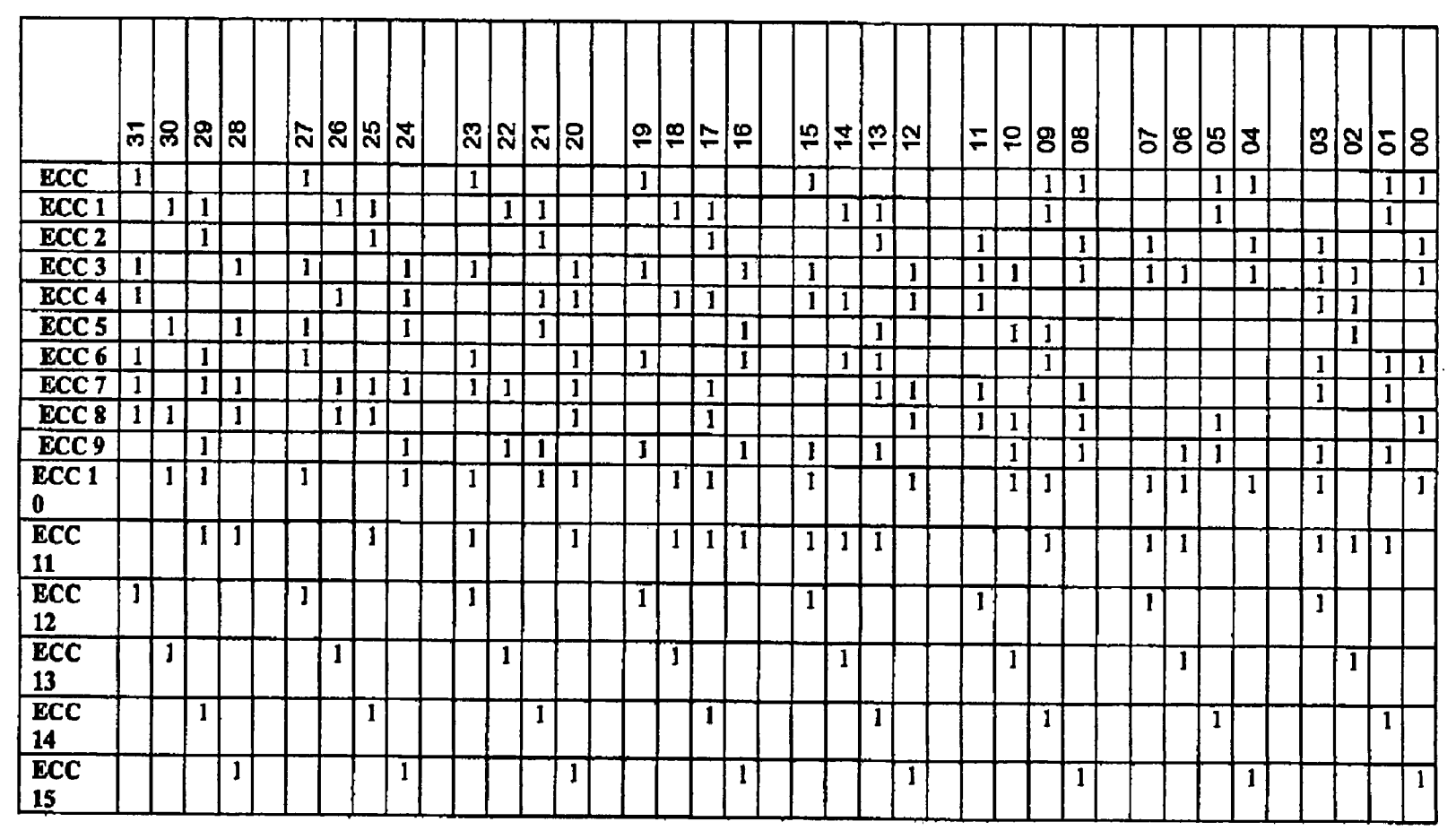

Spanning FIGS. 2A and 2B there is a single ECC table 20, specifying each of the signal states of bits ECC0-15 for each bit 0-127. As mentioned in the Summary section, one could modify this invention by shifting a family of bits to another location, or shifting many of the families to different locations and, if one shifted the other components of the invention with reference to the code specified by this shifted table, one could reproduce the invention in another form. What is meant by that is that if for example, the family of bits 127-124 were to have their ECC table (rows ECC 0-15 for each column 127-124) shifted to be under bits 72-75, and the ECC table for the bit pattern of ECC bits currently under columns 72-75 were shifted to replace the ECC bits under 124-127, the invention would still work. The code discovered is not, therefore, unique to the representation in FIGS. 2A-D, but the set of 32 family bit code patterns should be reproduced faithfully to produce a 128 bit by 16 bit code in order to expect the invention to function as described in detail here within.

Figure 3A:
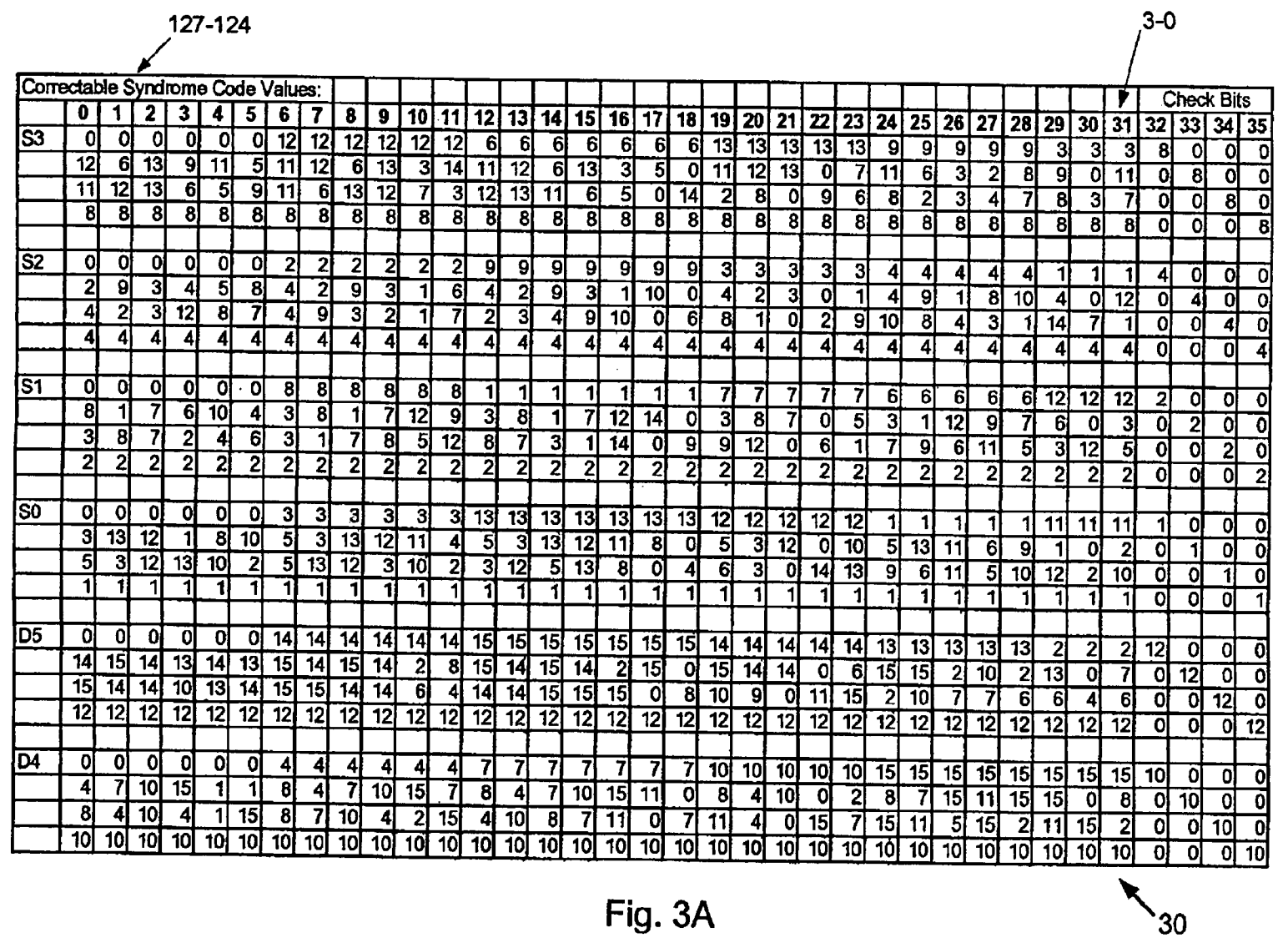
Figure 3B:
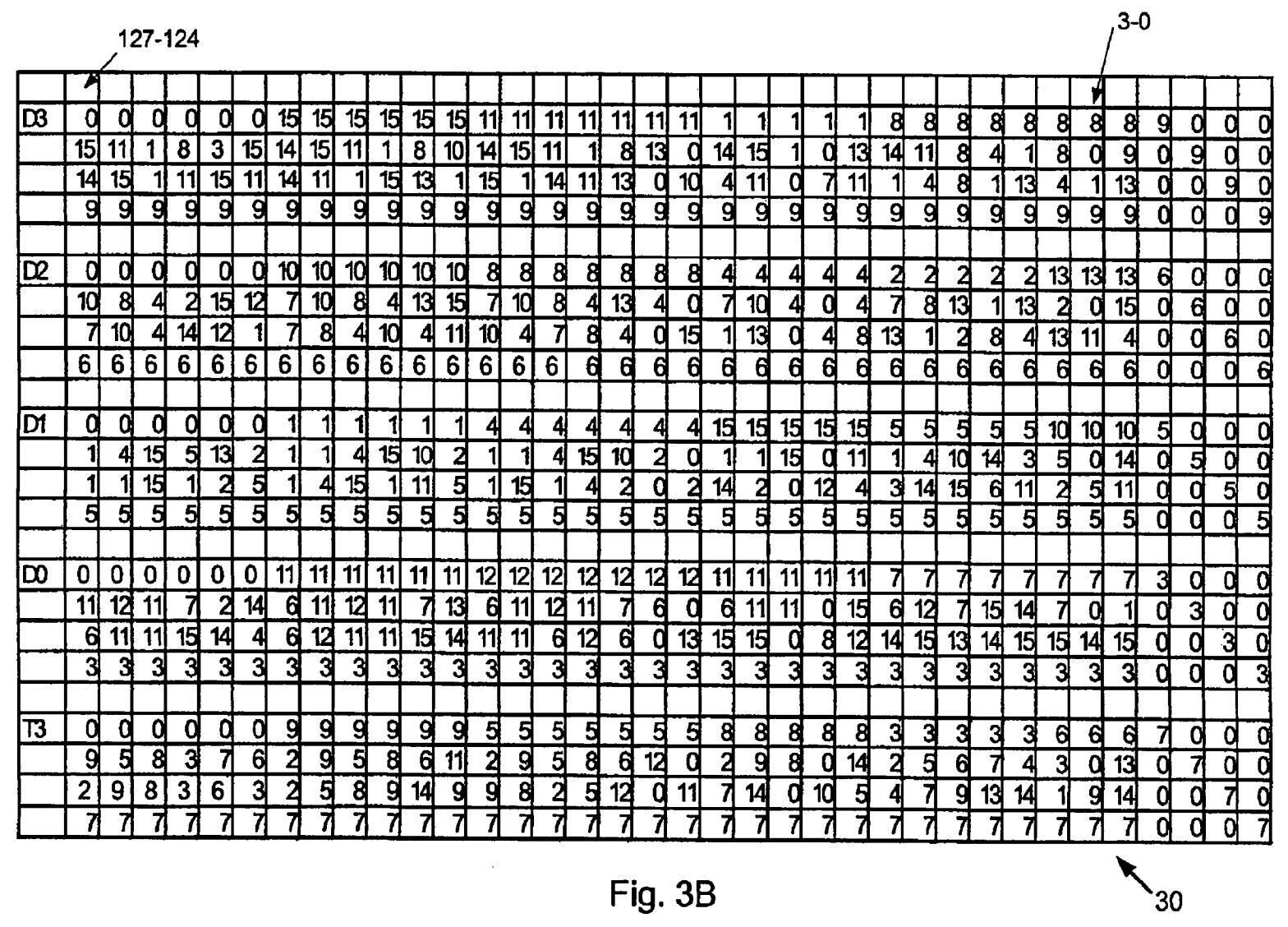
Figure 3C:
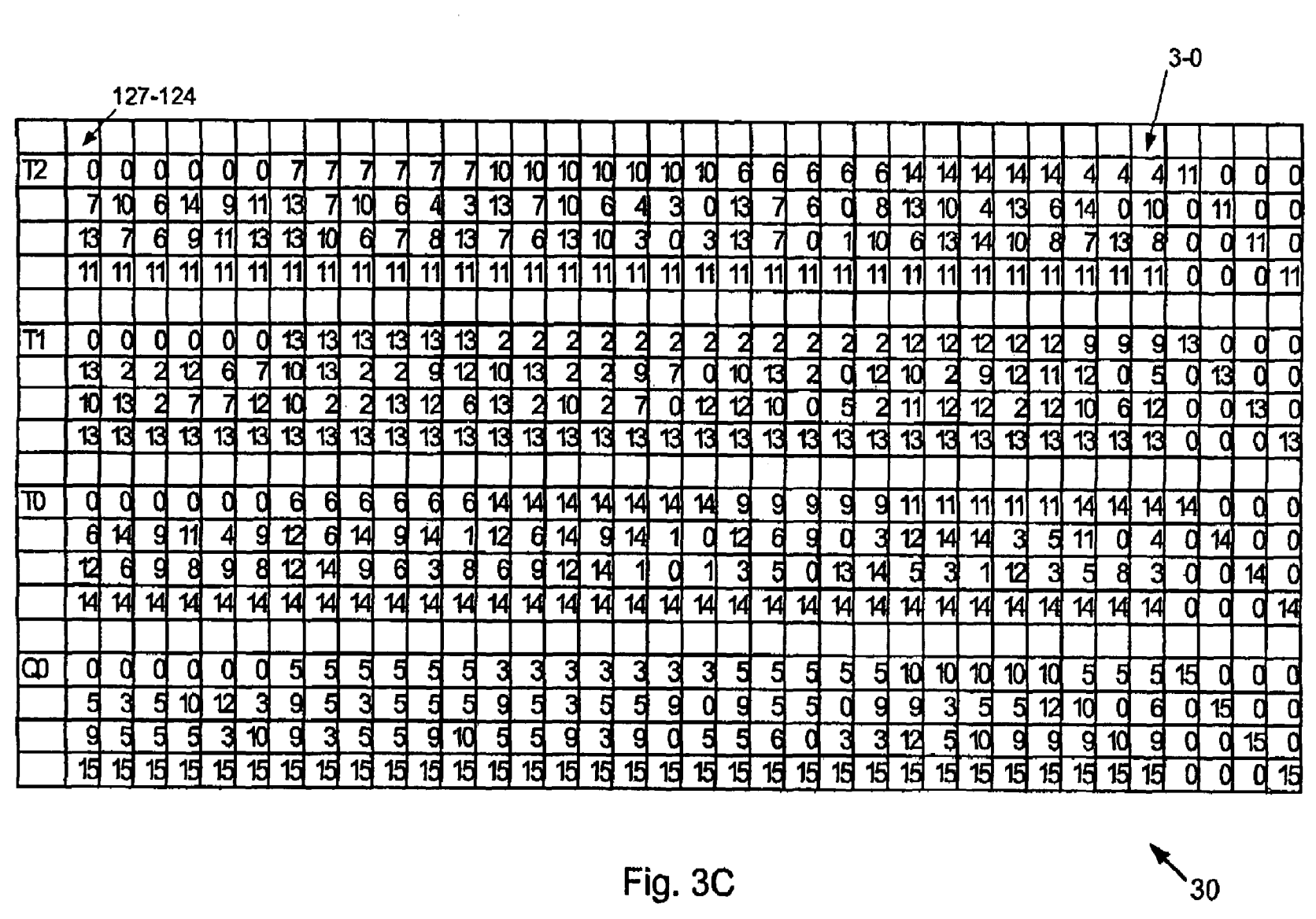

FIGS. 3A-C is a table of the correctable syndrome codes, specified in hex but printed in decimal form, so that for example, a 12 (shown in the table 30) is equivalent to $C_{hex}$ or $1100_2$. Thus each number in the table specifies 4 bits of the syndrome code needed to indicate a particular error within a family. There are 36 families (0-35) since there are 4 families for the check bits (32-35). The 15 possible error codes are specified in the left-most column and the family (DRAM number) is specified along the top. Thus a syndrome code of 0,9,2,7 indicates a T3 error in family 0 (RAM 0), meaning, with reference to FIG. 1, that bits 0, 1, and 2 are in error. This table thus specifies the 540 correctable errors the preferred embodiment of the invention can handle and how they are based on the syndrome generated in accord with the preferred form of the invention. (Note that the family (or column) designated "0" corresponds to bits 127-124 of the data word).

Figure 4:
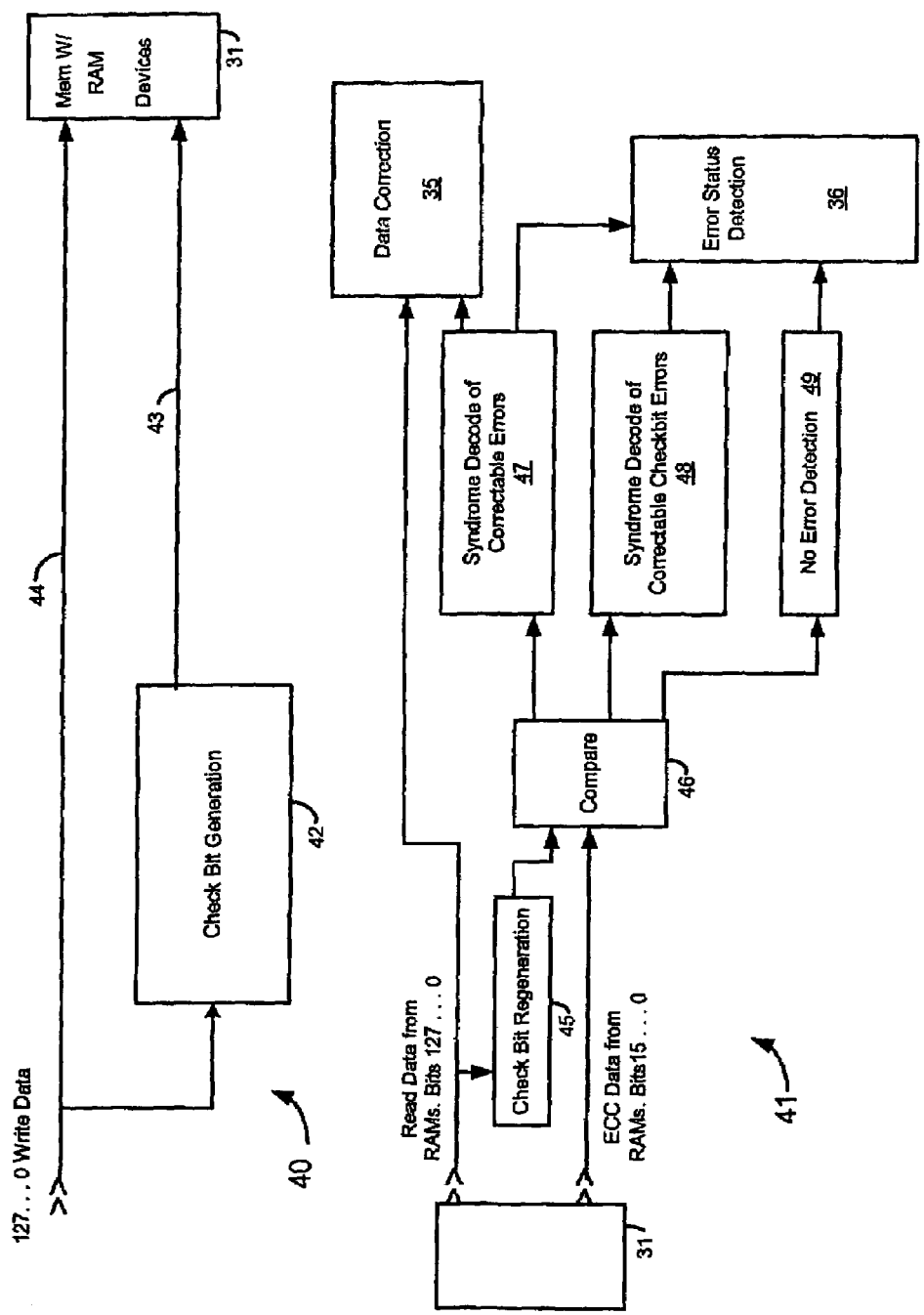
FIG. 4 is an ECC block diagram illustrating the flow of processes in accord with the preferred embodiments.

FIG. 4 illustrates the data flow in two related diagram parts 40 and 41. Diagram 40 shows the path of data into the DRAM or RAM device 31, in which 16 check bits are generated in block 42, and both the check bits and the original 128 bits of data are sent to the memory device on lines 43, and 44, respectively. Retrieving the word after being stored in memory involves check bit regeneration and comparison 45, 46, and based on the syndrome produced, decoding for correctible errors in the data word and the check bits, 47, 48, along with production of a tentative no-error signal 49. The 128-bit data word is corrected (if it can be) in data correction block 35 (where one of the 540 syndrome codes is produced to specify which bits need to be corrected). Also, error status detection is performed in block 36, generating an indicator signal showing that there was an error, and whether it was correctable (and corrected) or uncorrectable. The syndrome can be reported out to indicate which bits are bad if desired.

FIGS. 5-8 illustrate in more detail this process provided in overview from FIG. 4.

The preferred embodiment works with memory that uses two standard 72-bit DIMMs. (DIMMs are common parlance for Dual In-line Memory Modules, a common form of memory sold today, most commonly having thirty-six ×4 DRAMs per DIMM unit). These common DIMMs provides straightforward implementation for having a 144-bit word where there are 128 data bits and 16 check bits. Utilizing standard DIMMs reduces the cost of the system greatly, adding to the value of this invention. Under this two DIMM organization 16 check bits are generated for every 128-bit word that is sent into the memory. Check bits are the calculated odd parity across a specific pattern of RAM bits. After the 16 check bits are generated, using the error correction code table in the table 20 of FIGS. 2A-D, they are stored in memory. Table 20 shows the inventive ECC code that is used in the form described by the preferred embodiment. The 16 check bits associated with each word are generated by calculating odd parity across the "1's" set in each ECC row for each data bit [127:0]. (Thus the "table" is actually implemented in a parity tree.)

When retrieving data words the process of generating check bits is repeated with a twist.

Check bit regeneration occurs using Read data bits [127:0] from the RAMs. These regenerated check bits are compared bit-for-bit to the stored check bits, bits [143:128] from the RAMs. The comparison, using an XOR function results in a 16-bit syndrome code. A determination is made of which bits or family of bits in the 128-bit data-word may be in correctable error when the syndrome code is decoded.

Figure 5:
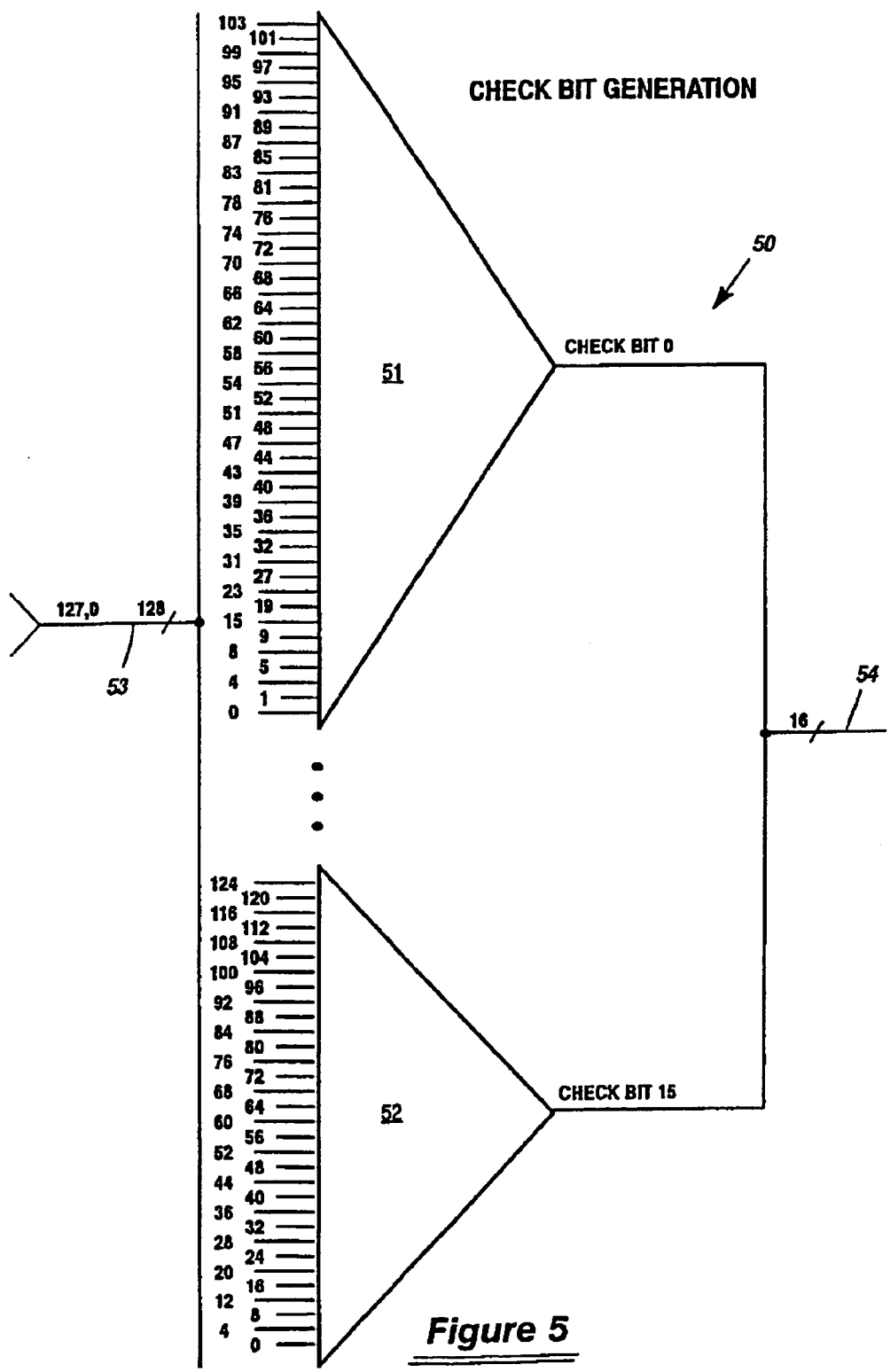
FIG. 5 is a block diagram illustrating two branches of a parity tree in accord with the preferred embodiment of the invention, organized in accord with the table of error correction codes of FIGS. 2A-D. The invention employs 16 such branches in any embodiment as described herein to generate the 16 check bits for a 128-bit word.

Refer now to FIG. 5, and note that write data consisting of a 128 bit word which is to be written to memory is used to generate 16 check bits via an odd parity tree 50 in accord with the prescribed connections based on the values in the ECC table of FIGS. 2A-D. Thus, for the first XOR gate branch 51 for the tree 50, bits 0, 1, 4, 8, and so on, to bit 103 of the 128 bit data word, as specified by the top line of FIG. 2A-D, are fed into the XOR gate 51 to produce an output for the first check bit (ECC) of the 16 check bits. A branch is constructed in this manner for each bit of the 16 ECC bits. For heuristic purposes only branches comprising XOR gates 51 and 52 that produce check bits 0 and 15, respectively, are illustrated. Thus, from an input line 53 of 128 bits (0-127), 16 output bits are produced on line 54. This accomplishes the function of block 42 of FIG. 4, and the data and the generated check bits which correspond to the data through the code of FIGS. 2A-D's table are now prepared to be written to memory. (As mentioned previously, the code word of FIGS. 2A-D could be modified by shifting families of code around, while still being within the scope of this invention. For this check generation module, such shifting to produce a code of the same effect but different form than the one of the preferred embodiment would be reflected in a changed distribution of the inputs to the 16 branches of the tree corresponding to the swapped values of the code). In all events, the check bit code after being generated, should be stored in RAM memory devices related to the ones used for storing this particular memory data word, thus requiring 128 plus 16 bits per word for storage. Due to the family restrictions, it is preferable to store the bits into ×4 DRAMs as indicated by the syndrome decode chart of FIG. 3. Thus, bits 127→0 into DRAMs 0→31, by 4's. Also, the 16 ECC bits should be stored into DRAMs 32-35.

When one wants to retrieve the word from the memory, the process employs the pieces described with reference to FIGS. 6A, 6B, 7 and 8, in accord with the preferred embodiments of this invention.

Figure 6A:
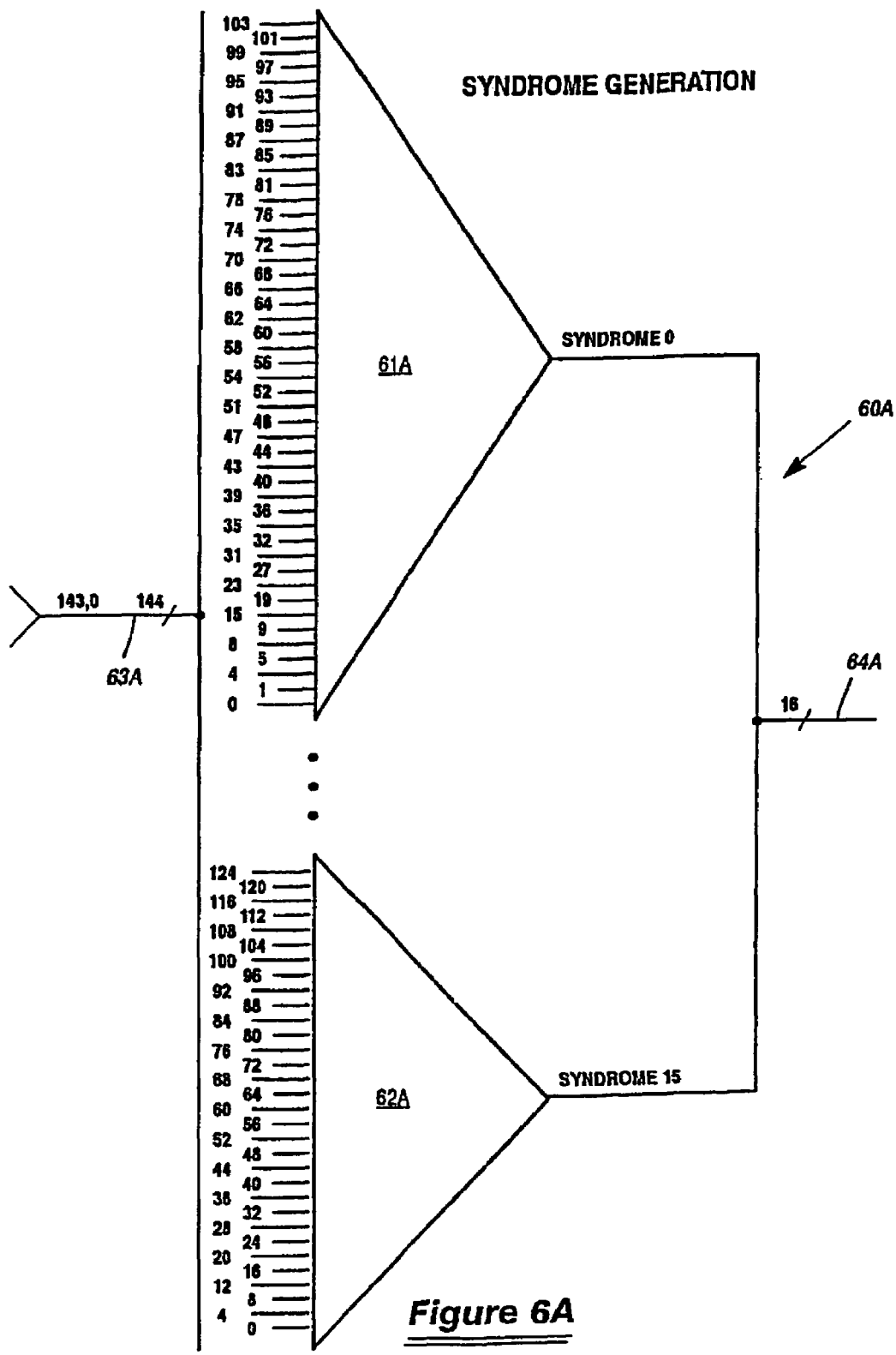
FIGS. 6A and 6B are also block diagrams illustrating two branches of a parity tree in accord with the preferred embodiment of this invention. The invention employs 16 such branches to generate the 16 syndrome code bits employed as described further herein.
Figure 6B:
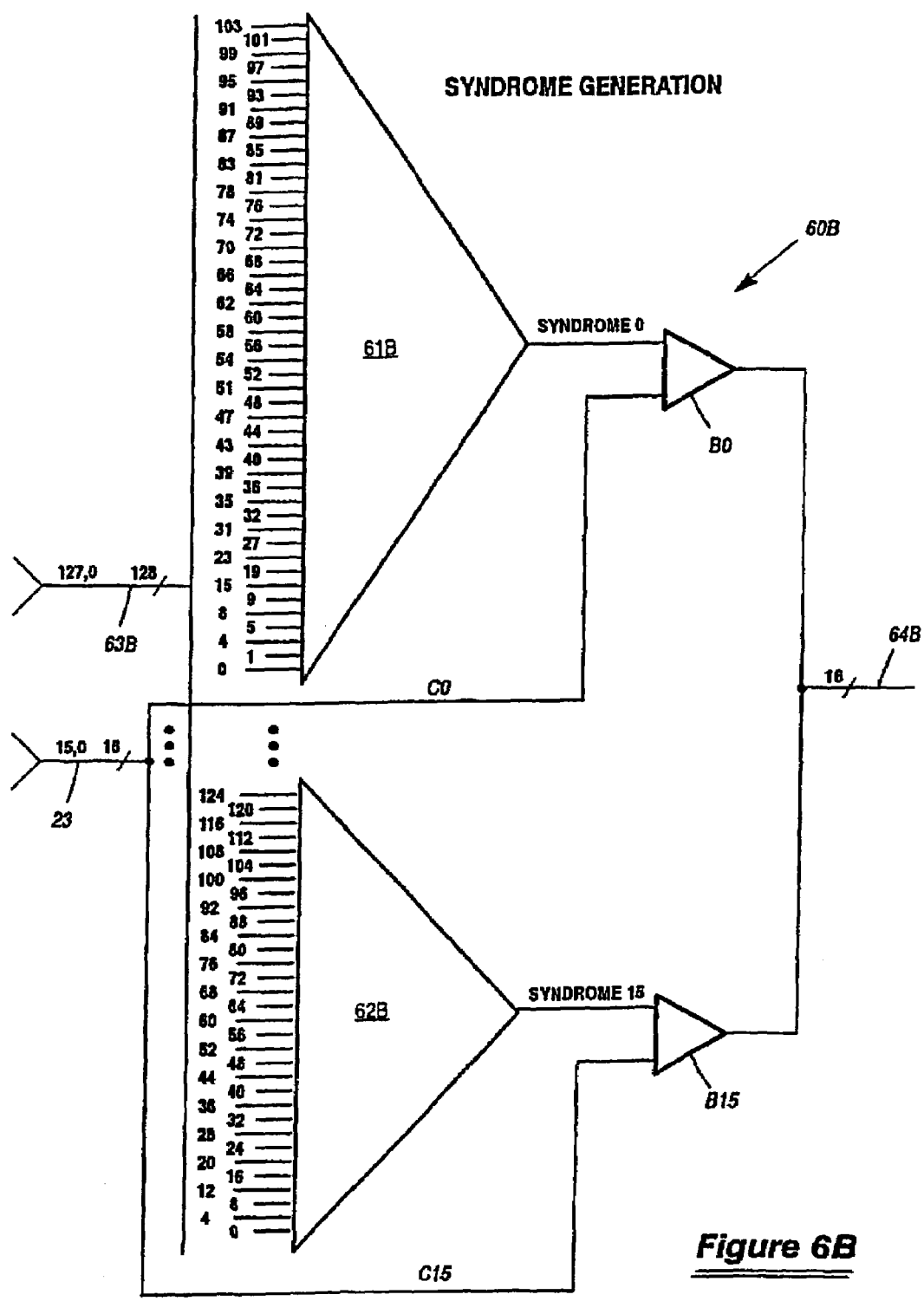

We illustrate alternate embodiments in FIGS. 6A and 6B. In 6A, the parity tree is labeled 60A, having two gates 61A and 62A. The processing may be faster since all the codes go through a single XOR branch for each syndrome bit, while in FIG. 6B, (where the the parity tree is labeled 60B, having two gates 61B and 62B) we add an XOR gate for each branch (B0 and B15, respectively) to accommodate the stored check bits separately. Mathematically these are the same but the variation of FIG. 6A should be faster due to less gate delay. Again, as in FIG. 5, the 128 input lines (here from the memory devices coming in on line 63A or 63B are dispersed to the 16 branches of an XOR tree to produce 16 bits. In FIG. 6A, in each one of these branches an additional input is taken from the memory, employing the stored check bits, dispersed C0-C15, to the branches 0-15, respectively. In FIG. 6B, the XOR tree branch has an additional root through an XOR which XOR's the result of the XOR of the assigned ones of the 128 bits from each branch 61B-62B with the ECC stored code bits C0-C15, through XOR gates B0-B15, respectively. Either way, there is a 16-line output line 64A, 64B that now contains the syndrome code for this data word and check bit code as output.

Thus, as illustrated in FIGS. 6A and 6B, check bits are read from the RAMs and XORed with the 16 bits generated from the same 128 bit data word via a parity tree as above in accord with the inventive ECC table of FIGS. 2A-D to generate a syndrome code of 16 bits. Again, if the reader is considering using the basic ideas herein with a shifted table; if the table of FIGS. 2A and 2B is shifted, the input lines to the 16 branches should be shifted in accord with the table shift.

Recall the earlier discussion indicating that these syndrome codes are graphically represented in tables 2a and 2b showing either a 1 or 0 for each 16-bits available to the syndrome code for each of the 128 bits in the data word. The table of FIGS. 3A-C represents the 540 correctable errors by showing the syndrome code values representative of each type of error for each RAM device. The syndrome code is a set of 4 numbers displayed in a decimal form of hex.

Figure 7:
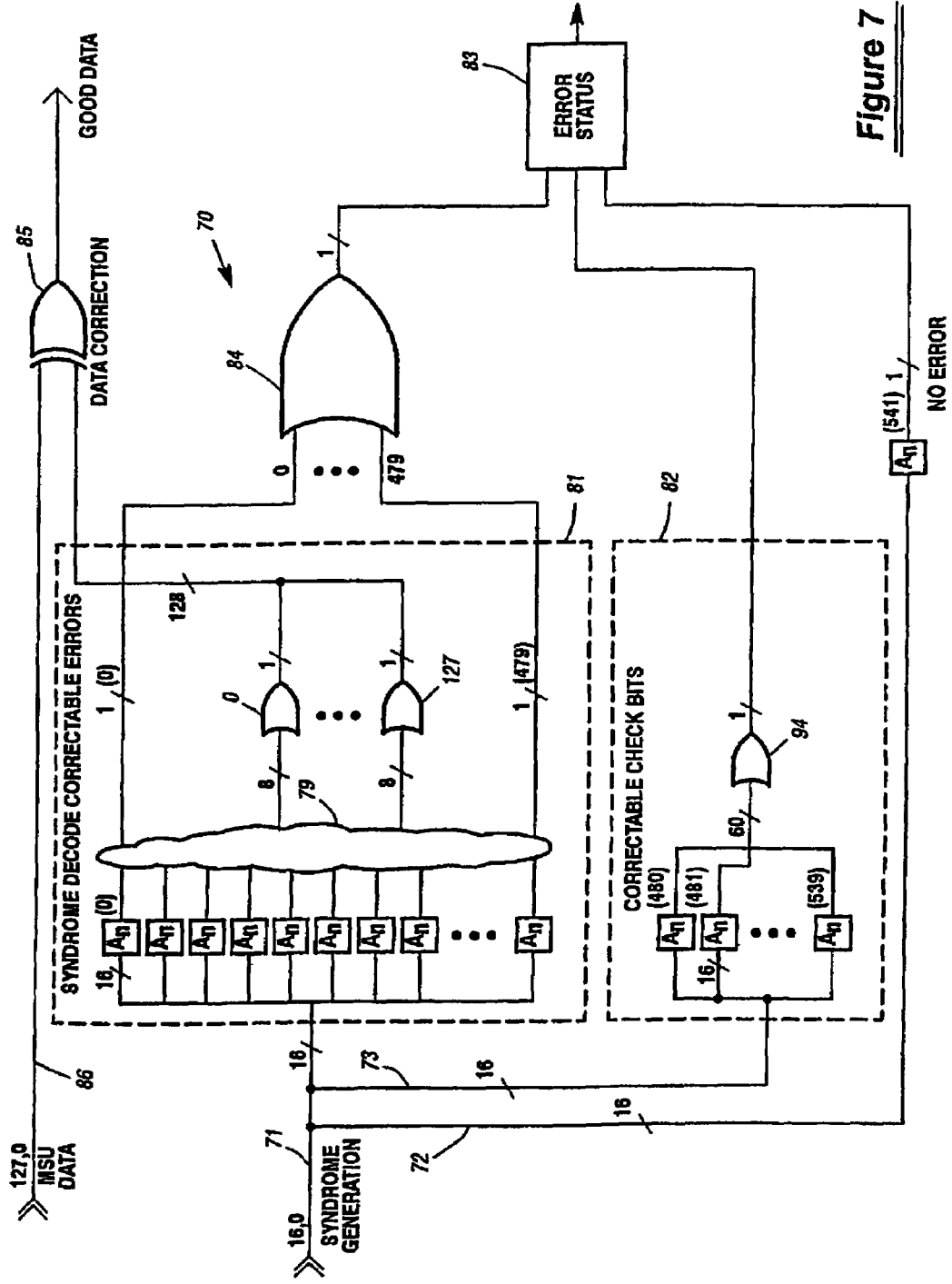
FIG. 7 is a block diagram illustrating the syndrome decode function in accord with a preferred embodiment of the invention, and also illustrating the generation of the error status bit, also in accord with a preferred embodiment of the invention.
Figure 9A:
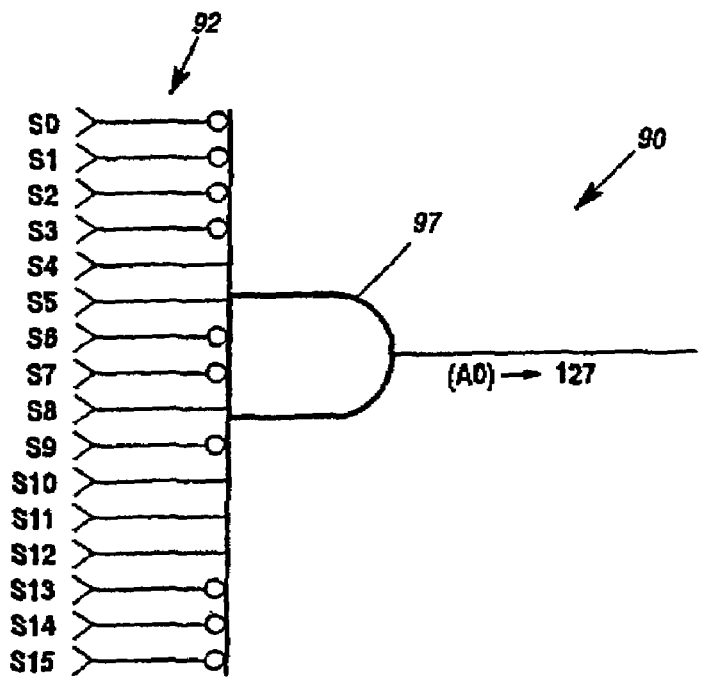
FIGS. 9A and 9B are block diagrams illustrating an AND gate and an input arrangement of syndrome lines to it for the circuit of FIG. 7, and is best considered with reference to a subpart of FIG. 7, illustrated in FIG. 10.
Figure 9B:
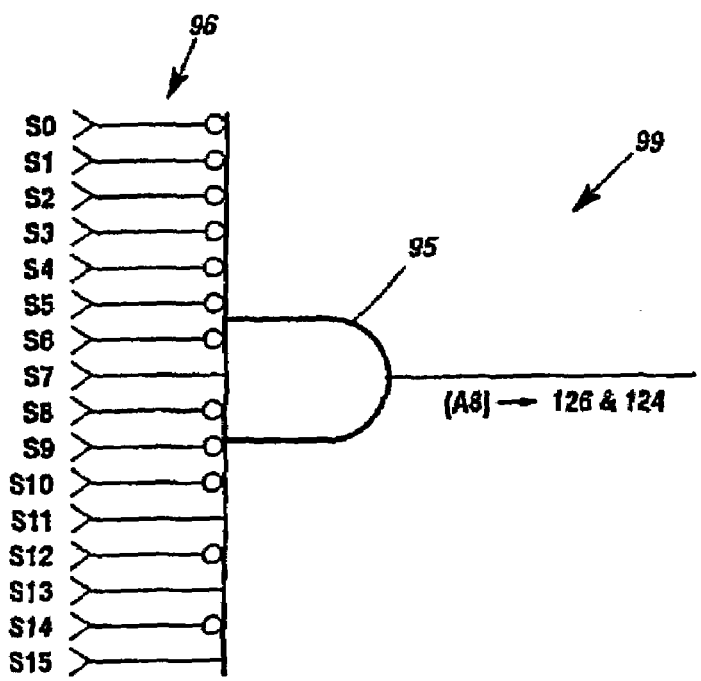
Figure 10:
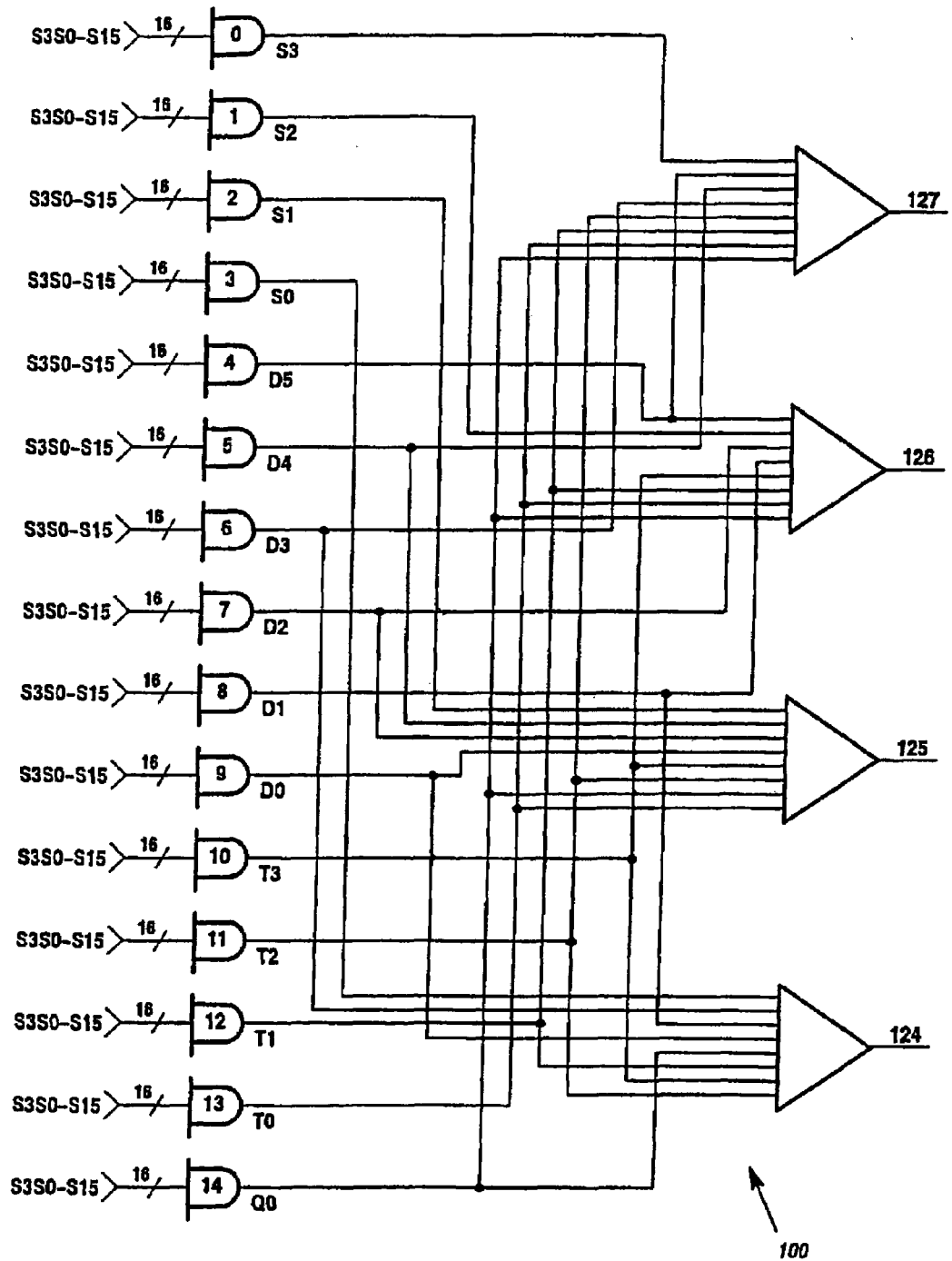
FIG. 10 is a subpart of the circuit of FIG. 7, containing a set of four XOR gates each receiving input from eight of the AND gates of FIG. 9.

The syndrome codes are decoded through a complexity of AND gates, as illustrated in an abbreviated manner which is understandable by those of ordinary skill in this art in FIG. 7, with reference also to FIGS. 9A, 9B, and 10. These illustrations fit together as follows. The AND gates of FIGS. 9A and 9B (91 and 95, respectively) illustrate the same general construction for AND gates An (0-539) of FIG. 7 and AND gates 0-15 of FIG. 10. The AND gates 0-14 of FIG. 10 have identical inputs to those illustrated for gate 91 of FIG. 9A but the inputs are inverted in accord with the code section relevant to that particular bit as determined by the inventive code (and described in more detail just below for two such AND gates as examples). These AND gates and are the same as AND gates An of FIG. 7. Each subsequent group of AND gates serving each next set of four OR gates is grouped in a pattern similar to that illustrated in FIG. 10 for ANDs 0-14, so that eight error outputs can feed each of them in accord with the FIG. 1 arrangement of possible errors (eight for each of the four bits in the family). The inputs are inverted in accord with the code for that family as set out in FIGS. 2A-D. The reason for this abbreviated illustration will become apparent as we describe the function in greater detail.

Recall that there are 15 possible error types for each family of four bits and one no-error condition as illustrated in Table 10. It should be noted that since the 15$^{th}$ ECC value will always be zero inputs, that is, when all the bits are good in a family there will be no error value, there actually need only be 15 AND gates to handle the syndrome decode for the 128-bit word.

While it would be possible to compute that signal value of the syndrome and compare it to a look-up table, a faster way to get at the particular error found in the syndrome so that it can be used to correct the error, is to provide a set of 16 syndrome bits to 15 AND gates for each family of bits, simultaneously. FIG. 10 illustrates how four OR gates are set up with eight inputs each from the 15 AND gates. Before discussing FIG. 10, please refer to FIG. 9, the first such AND gate 90, which would provide input to correct bit 127. Note that a negative or inverted input is provided for syndrome bits 0, 1, 2, 3, 6, 7, 9, and 13-15. This corresponds with the bit pattern of zeroes for bit 127 of the chart of FIGS. 2A-D. The table of FIGS. 3A-C could also be used, which is a transposition of the FIG. 2A-D table and some modulo-2 results for each of the 15 possible error states for each of the families in the word plus the word's checkbits. This AND gate 90 input arrangement is unique to OR gate 127, as can be seen from FIG. 10, wherein the only output from gate 0 (the same as Gate 90 of FIG. 9A) goes to gate 127. The AND gate 99 of FIG. 9B has a different arrangement, corresponding to the D1 results under column 0 of Table 3. Thus the decimal values for D1, (0, 1, 1, and 5) translate into the binary pattern: 0,0,0,0: 0,0,0,1:0,0,0,1:0,1,0,1, which is repeated in the inverter sequence on the inputs to gate 99 of FIG. 9B. To get the double bit error values one XORs the values of the two relevant bits from the table of FIGS. 2A-D. Thus, the relevant bits, 0, 2, (from table 1 which could be in error for a D1 error) correspond to bits 126 and 124, which gives us two binary patterns of ECC bits: 0,0,0,0,0,0,1,0,0,1,0,0,0,1,0,0 and 0,0, 0,0,0,1,1,0,1,0,0,0,1, respectively. XOR-ing these (adding these using modulo-2 addition) yields the binary pattern 0,0, 0,0:0,0,0,1:0,0,0,1:0,1,0,1, the pattern applied to the inputs to AND gate 99. All the AND gates are figured similarly for the entire 480 correctable errors in the preferred embodiment as illustrated in FIG. 7. We also do the same thing with the correctable error bits for the check bits, but there we simply feed the output into a single sixty input OR gate 94, because we are only interested in knowing if there was an error that we could correct within the check bits.

If desired, any error found could be sent to a maintenance processor, and if one does that one might want to continue the pattern of applying each 16 AND gate set to the four families of check bits as inputs to 4 OR gates to determine the family with the errors. However, how the maintenance and replacement functions are performed are beyond the scope of this invention, so it is sufficient to note that we could provide output indicating which family is having errors to indicate a maintenance/replacement problem to a user of the system.

The 541$^{st}$ AND gate (541, FIG. 7) has all inverted inputs, and if the syndrome is all zeros, a "No Error" output is produced therefrom.

So to reiterate how the AND gate function works, refer again to FIG. 9A. There are eight possible syndromes using this combination that could indicate an error in bit 127. These are found in FIG. 1: they are bits 0, 4, 5, 6, and 11-14 of the table 10 chart. Therefore, if any bit in the syndrome is not a 1 value for all the input bits to AND gate 90 that are not inverted, or if any of the bits in the syndrome are not a 0 value for inverted input bits to the AND gate 90, it will cause a 1 output and flip the value of the OR gate, indicating an error for bit 127. In this way, for bit 127 (and similarly for all the other 127 bits of the data word), one 16-AND gate set will produce any positive outputs in a single clock-cycle, indicating that the OR gate it feeds will go to a high output (a 1) and that bit corresponding to that OR gate will need to be flipped or corrected.

In FIG. 7's diagram 70, the over all set up is illustrated. Here, the syndrome input line 71 provides the syndrome's 16-bit input to blocks 81 (testing the data word of 128 bits of correctable error), and via line 73 to block 82 (testing the 16 check bits for error). The syndrome code is also sent on line 72 to an AND gate (541) which if the result is zero indicates no error to the Error status block 83.

Block 81's AND gates generate a value from the 16 bit syndrome saying either no, this gate has no match with the value taken from the table of FIGS. 3A-C corresponding to this gate, or yes, there is a match.

Each of the 16 syndrome codes are sent through 541 AND gates (FIG. 7). Of the 541 output lines, only one may display a "1", while the other 540 show "0", (barring a failure in the AND gate hardware). The output of AND gates 0-479 are provided to OR gate 83, which should show a 1 on the output if there is an error. The 0-479 AND gates also provide output on an eight per OR gate basis to the OR gates 0-127 which represent each bit of the 128-bit data words. For any one of them which provides a 1 output, the bit represented by that gate should be flipped to change its signal value since it is determined to be in error. A cloud 79 represents the interconnections from the AND gate outputs to the OR gate inputs to simplify this exposition. Gate 541 will show a 1 if there is no correctable error detected. If there is no error shown then the 128-bit data word and it's 16-bit parity check code are good data. An error signal from one of the AND gates 0-480 indicates a particular error pattern which can be used to correct the 128 data bits by specifying what bit(s) is(are) in error. The output of the OR gates 0-128 is put into the XOR gate 85, which provides a simple means to flip any bad bits in the 128 bit data word input on line 86 to correct the bad data. The syndrome code is used to determine if there is no error, if there is a correctable error, or if there is an uncorrectable error, and are handled in the error status box 83 (see FIG. 8).

Figure 8:
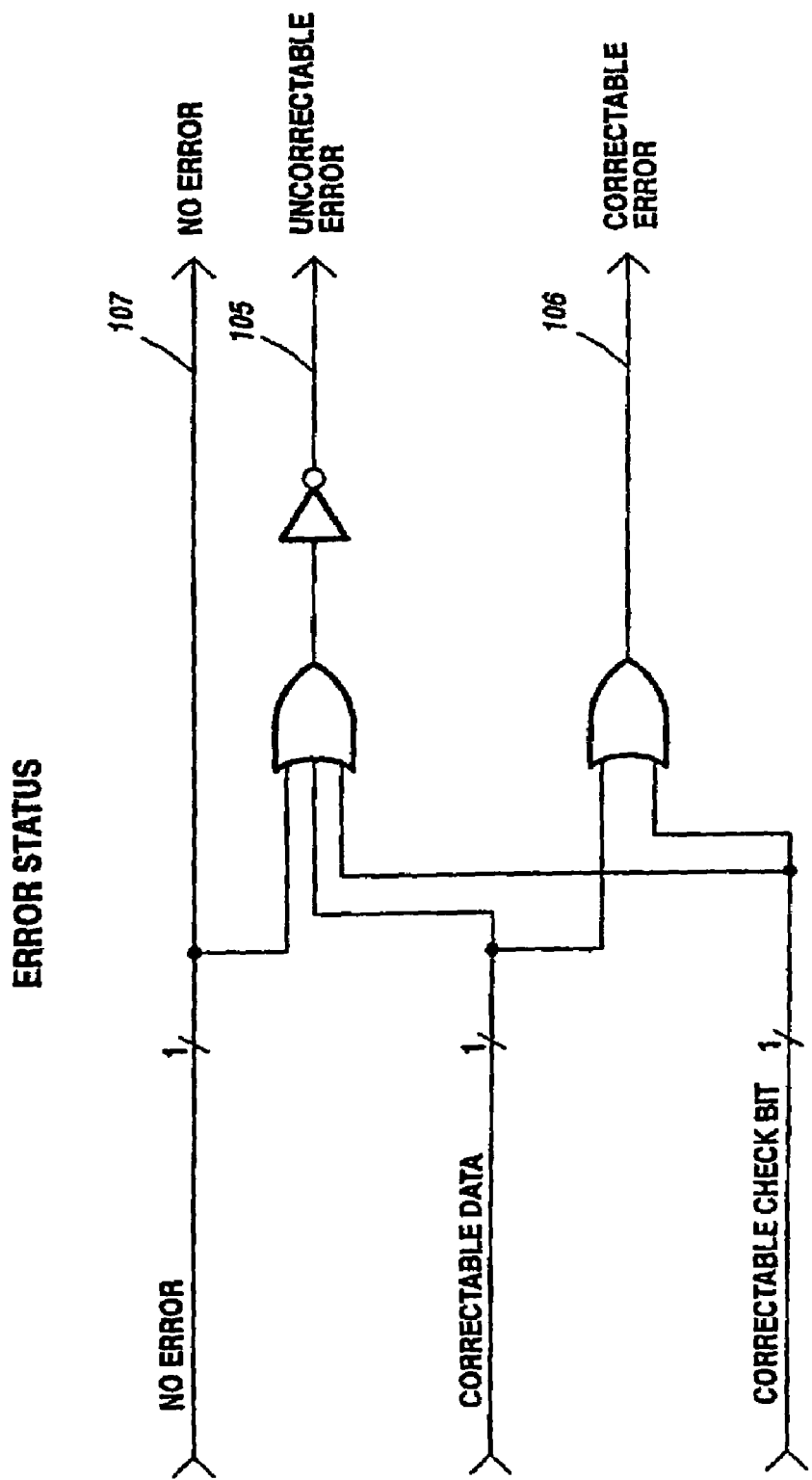
FIG. 8 is a block diagram illustrating the error status function in greater detail than the illustration of FIG. 7.

FIG. 8 provides three indicators, Error detected but uncorrectable 105, Error detected and corrected 106, and No detectable error 107, shown with abbreviated words. The NO ERROR input comes from the AND gate with the completely inverted syndrome input, producing a one only if all the syndrome bits are zero. The CORRECTABLE DATA input comes from OR gate 84 of FIG. 7. The signal CORRECTABLE CHECK BIT comes from OR gate 94 of FIG. 7, indicating that one of the 60 detectable check bit errors occurred in this data word. Thus, if line 106 is positive, one of the 540 possible detectable errors was found, and the data word was corrected based on knowing which error(s) occurred to which of the 128 plus 16 check bits. If there was no error, line 107 should be positive. However, if any two of the three inputs are positive, the output 105 should be positive, indicating an uncorrectable error and bad data in the 128-bit data word.

So, in sum, the data correction circuit can toggle up to four bits in a family and up to one bit in any family of the 128-bit word. The three status lines indicate either a no error, a correctable error, or a Multiple Uncorrectable Error (MUE). The logic needs 540 AND gates to determine correction due to 36 RAM devices multiplied by 15, which is the sum of 4 single bit error possibilities within a family, 6 double bit error possibilities within a family, 4 triple bit error possibilities within a family and 1 quad bit error within a family. Number 541 arbitrarily is designated the no error. We know based on a computer calculation that none of the multiple bit errors will map into one of the correctable errors or a no error. Therefore, by compliment, if there is a no "no error" signal and there is an error signal but no correctable error signal then there must be a MUE and the word will be handled as corrupted data.

Adjacent bits are located within the same RAM device, or family, while non-adjacent bits are any two or more bits located on different RAM devices, or families, within the 144-bit word. The use of ×4 bit DRAM chips or devices are an integral aspect of the invention's organization. There are 32 RAM devices dedicated for the 128-bit word and 4 RAM devices are allocated for the 16 check bits over two standard DIMMs. It is important to realize that the multi-bit correction within a single RAM and double bit detection within two different RAMs increases the reliability of the memory, making data corruption less likely. It is further understood that data problems that occur in excess of these limitations may also be corrected or detected, but this is not guaranteed, due to the restraints of the ECC size and word size.

It is realized that the probability of any one single bit error is relatively high and this invention corrects any and all of these errors. Further, the probability of multi-bit errors in any one device is much lower than even the probability of any two non-adjacent bit errors, but these represent all the two next highest probable error types. Through the current invention all the double bit non-adjacent errors are detected, preventing data corruption, from this second most common error type. Also this invention provides single and multi-bit correction within any single RAM device. By covering the highest sources of error in server memory subsystems the probability that an error will not be corrected or even detected when utilizing the current invention is quite miniscule, which in turn increases the memory reliability at very reasonable cost. It is also important to realize that utilizing standard 64-bit ×4 bit DIMMs reduces the cost of the system greatly, adding to the value of this invention. Thus, the applicants have defined a commercially valuable subset of correctable and detectable errors and provided a description of how a particular set of ECC codes and be used to provide that the commercially valuable set of correctable and detectable errors are corrected or detected.

Accordingly, the invention is limited only by the following appended claims.

What is claimed is:

1. Apparatus for detecting and correcting errors in a 128 bit word stored in multiple 4-bit RAMs of a RAM memory, said apparatus comprising:
   a check bit generator to generate 16 check bits from said 128 bit data word, said check bits to detect all double-bit errors that occur in said word, to detect multi-bit uncorrectable errors occurring in said word, and to detect and correct all possible combinations of familial errors occurring in bits of said word stored in any one of said 4-bit RAMs;
   a check bit regenerator to regenerate 16 check bits from said 128 bit data word after said data word is retrieved from said RAM memory;
   a syndrome generator for generating 16 syndrome bits based on a comparison between said generated check bits and said re-generated check-bits, said syndrome bits to determine whether any errors that are detectable by said check bits have occurred.

2. The apparatus of claim 1, and further including a syndrome decode circuit to decode said syndrome bits to identify any error that is detected by said check bits.

3. The apparatus of claim 2 wherein said syndrome decode circuit generates a no error signal if said syndrome bits indicate that no error occurred.

4. The apparatus of claim 1 wherein said RAM memory stores said data word into two 72 bit DRAMs along with said 16 generated check bits.

5. The apparatus of claim 1 wherein said check bit generator is an XOR tree including 16 branches, each generating a respective one of said 16 check bits.

6. The apparatus of claim 5 wherein each of said 16 branches is connected to receive a different predetermined subset of said 128 bits of said data word.

7. The apparatus of claim 6 wherein each row of the following table indicates by "1s" a subset of said 128 bits to be provided to a respective branch of said XOR tree:

| | 127 | 126 | 125 | 124 | 123 | 122 | 121 | 120 | 119 | 118 | 117 | 116 | 115 | 114 | 113 | 112 | 111 | 110 | 109 | 108 | 107 | 106 | 105 | 104 | 103 | 102 | 101 | 100 |
|---|---|---|---|---|---|---|---|---|---|---|---|---|---|---|---|---|---|---|---|---|---|---|---|---|---|---|---|---|
| ECC 0 | | | | | | | | | | | | | | | | | | | | | | | | | | | | |
| ECC 1 | | | | | | | | | | | | | | | | | | | | | | | | | 1 | | 1 | |
| ECC 2 | | | | | | | | | | | | | | | | | | | | | | | | | 1 | | | |
| ECC 3 | | | | | | | | | | | | | | | | | | | | | | | | | | 1 | | |
| ECC 4 | | | | | | | | | | | | | | | | | | | 1 | | 1 | | 1 | 1 | | 1 | 1 | 1 |
| ECC 5 | 1 | | | 1 | | | | | | | | 1 | 1 | 1 | | | | | | | | 1 | | | | | | |
| ECC 6 | 1 | | 1 | | | | | | 1 | 1 | | | 1 | | | 1 | | | | | | | | | | | | |
| ECC 7 | | | | | | | | | 1 | | 1 | 1 | | | | | | 1 | | | | | 1 | | | | | |
| ECC 8 | | | | | | | 1 | 1 | | | | | | | 1 | | 1 | 1 | | | 1 | | | | | | | 1 |
| ECC 9 | | | | 1 | | | | 1 | | 1 | 1 | 1 | | | | | 1 | | 1 | | 1 | | | | | | | |
| ECC 10 | 1 | 1 | | | | | | | | | | 1 | 1 | 1 | | | | | | | | 1 | 1 | | 1 | | | 1 |
| ECC 11 | 1 | 1 | | | 1 | | | | | | 1 | | | | 1 | 1 | | | | 1 | | | 1 | | 1 | | | |
| ECC 12 | | 1 | | | | | 1 | | | | | | | | | 1 | 1 | | | 1 | | | | 1 | | | | |
| ECC 13 | | | 1 | | | | | 1 | | | | | | | 1 | | | | | | | | | | | 1 | | |
| ECC 14 | | | | | 1 | 1 | | | 1 | 1 | | | | 1 | | | | 1 | 1 | 1 | | | | | | | | |
| ECC 15 | | | | | | | | | | | 1 | | | | | | | | | | 1 | | | 1 | | | | 1 |

| | 99 | 98 | 97 | 96 | 95 | 94 | 93 | 92 | 91 | 90 | 89 | 88 | 87 | 86 | 85 | 84 | 83 | 82 | 81 | 80 | 79 | 78 | 77 | 76 | 75 | 74 | 73 | 72 |
|---|---|---|---|---|---|---|---|---|---|---|---|---|---|---|---|---|---|---|---|---|---|---|---|---|---|---|---|---|
| ECC 0 | 1 | 1 | | | | | | | | | | | | | 1 | | | | | | | | | | | | | 1 |
| ECC 1 | 1 | 1 | | 1 | | | | | | | | | | | | | | | | | | | 1 | | 1 | | 1 | |
| ECC 2 | | 1 | | | | | | | | | | | | 1 | 1 | | | | | | | | 1 | | 1 | 1 | 1 | |
| ECC 3 | 1 | | 1 | | | | | | | | | | | | | | | | | | | 1 | | 1 | | | | |
| ECC 4 | 1 | | | | | | | | | | | 1 | 1 | | | | | 1 | 1 | 1 | 1 | 1 | 1 | 1 | | | | 1 |
| ECC 5 | | | | | | | | | 1 | 1 | 1 | 1 | 1 | | | | 1 | 1 | 1 | | | | | | | | | |
| ECC 6 | | | | 1 | | | | | | 1 | 1 | 1 | | | | | 1 | | 1 | | | 1 | | | | | | |
| ECC 7 | 1 | | | 1 | 1 | | | 1 | | 1 | | | 1 | | 1 | | | | | 1 | | | 1 | | | | | |
| ECC 8 | | | | | | 1 | 1 | | 1 | | | | | | | 1 | 1 | 1 | | | | | | 1 | | | | |
| ECC 9 | 1 | | | | 1 | 1 | 1 | | 1 | | | | | | | 1 | | | 1 | | 1 | | 1 | | 1 | | | |
| ECC 10 | | 1 | | | | | | | | | 1 | | 1 | 1 | | | | 1 | 1 | | | 1 | | | | | 1 | |
| ECC 11 | | 1 | | | | | 1 | 1 | | | | | | 1 | | | 1 | | | | 1 | | | | | | 1 | |
| ECC 12 | | | 1 | 1 | 1 | 1 | | | | | | 1 | | | | | | | | 1 | | | | | | 1 | | |
| ECC 13 | 1 | | | | | | 1 | | | | 1 | | | 1 | | | | | | | | | | 1 | | | | |
| ECC 14 | | | | | | 1 | | 1 | | | | | | | | | | | | | | | | | | | | 1 |
| ECC 15 | | | 1 | | | | | | 1 | | | | | 1 | 1 | 1 | | | | | | | | | | | | |

| | 71 | 70 | 69 | 68 | 67 | 66 | 65 | 64 | 63 | 62 | 61 | 60 | 59 | 58 | 57 | 56 | 55 | 54 | 53 | 52 | 51 | 50 | 49 | 48 | 47 | 46 | 45 | 44 |
|---|---|---|---|---|---|---|---|---|---|---|---|---|---|---|---|---|---|---|---|---|---|---|---|---|---|---|---|---|
| ECC 0 | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| ECC 1 | 1 | 1 | 1 | 1 | 1 | 1 | 1 | 1 | | | | | | | | | | | | | | | | | | | 1 | 1 |
| ECC 2 | 1 | 1 | 1 | 1 | | | | | 1 | 1 | 1 | 1 | | | | | | | | | 1 | 1 | 1 | 1 | | | | |
| ECC 3 | 1 | 1 | | | 1 | 1 | | | 1 | 1 | | | 1 | 1 | | | 1 | 1 | | | 1 | 1 | | | 1 | 1 | | |
| ECC 4 | 1 | | 1 | | 1 | | 1 | | 1 | | 1 | | 1 | | 1 | | 1 | | 1 | | 1 | | 1 | | 1 | | 1 | |
| ECC 5 | 1 | 1 | 1 | 1 | | | | | | | | | 1 | 1 | 1 | 1 | 1 | 1 | 1 | 1 | | | | | | | | |
| ECC 6 | 1 | 1 | | | 1 | 1 | | | | | | | 1 | 1 | | | 1 | 1 | | | | | | | 1 | 1 | | |
| ECC 7 | 1 | | 1 | | 1 | | 1 | | | | | | 1 | | 1 | | 1 | | 1 | | | | | | 1 | | 1 | |
| ECC 8 | 1 | 1 | 1 | 1 | | | | | | | | | | | | | | | | | 1 | 1 | 1 | 1 | | | | |
| ECC 9 | 1 | 1 | | | 1 | 1 | | | | | | | | | | | | | | | 1 | 1 | | | 1 | 1 | | |
| ECC 10 | 1 | | 1 | | 1 | | 1 | | | | | | | | | | | | | | 1 | | 1 | | 1 | | 1 | |

-continued

| | 43 | 42 | 41 | 40 | 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|---|---|---|---|---|---|---|---|---|---|---|---|
| ECC 11 | 1 | | | | | | 1 | | | | | | | | | | | | | | | | | | | | | |
| ECC 12 | 1 | 1 | | | | | | | | | | | | | | | | | | | | 1 | | | | | | |
| ECC 13 | | | | | | | 1 | | | | | | | | | | | | | 1 | | | 1 | | | 1 | 1 | |
| ECC 14 | | | | | | 1 | | 1 | | | | | | | | | | | | | | | | 1 | | | | |
| ECC 15 | | | 1 | | | | | 1 | | | | | | | | | | | | | | | | | | | | 1 |

| | 43 | 42 | 41 | 40 | 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|---|---|---|---|---|---|---|---|---|---|---|---|
| ECC 0 | 1 | | | 1 | | 1 | | | | | | | | | | | | | | | | | | | | | | |
| ECC 1 | 1 | 1 | 1 | 1 | | | 1 | | | | | | | | | | | | | | | | | | | | | |
| ECC 2 | 1 | 1 | | | 1 | 1 | 1 | | 1 | | | | | | | | | | | | | | | | | | | |
| ECC 3 | 1 | | 1 | | | | 1 | | | 1 | | | | 1 | | | | | | | | | | | | | | |
| ECC 4 | 1 | | 1 | 1 | | | | 1 | 1 | | | | | | | | | | | | | | | | | | | |
| ECC 5 | 1 | | | | | | | | 1 | | | 1 | | 1 | | | | | | | | | | | | | | |
| ECC 6 | 1 | | | | | 1 | | 1 | | | 1 | | | | | | | | | | | | | | | | | |
| ECC 7 | 1 | | | | 1 | | | | 1 | 1 | | | | | | | | | | | | | | | | | | |
| ECC 8 | | | | | 1 | | | | | | 1 | | | | | | | | | | | | | | | | | |
| ECC 9 | | | | | 1 | | 1 | | | | | | | | | | | | | | | | | | | | | |
| ECC 10 | | 1 | | | | | 1 | | | | | | | | | | | | | | | | | | | | | |
| ECC 11 | | | | | | | | | | | | | | | | | | | | | | | | | | | | |
| ECC 12 | | | 1 | | | | | | | | 1 | | | | | | | | | | | | | | | | | |
| ECC 13 | | | | | | 1 | | | | | | | | | | | | | | | | | | | | | | |
| ECC 14 | | | | 1 | | | | | | | | | | | | | | | | | | | | | | | | |
| ECC 15 | | | | | | | | | | | | | | | | | | | | | | | | | | | | |

| | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| ECC 0 | 1 | | | | | | | | | | | | | | | 1 |
| ECC 1 | | 1 | 1 | | | | 1 | | | | 1 | | | | 1 | 1 |
| ECC 2 | | | 1 | 1 | | | 1 | | | 1 | | | 1 | 1 | | |
| ECC 3 | 1 | | 1 | 1 | 1 | | | | | 1 | | | 1 | 1 | 1 | |
| ECC 4 | | 1 | | 1 | 1 | 1 | | | 1 | | | | 1 | 1 | | |
| ECC 5 | 1 | | | | 1 | 1 | 1 | | | | | | | | 1 | |
| ECC 6 | | | | | | 1 | | 1 | 1 | | 1 | | | | | |
| ECC 7 | | 1 | 1 | 1 | | | 1 | | 1 | 1 | | | | | | |
| ECC 8 | | | | 1 | 1 | | 1 | 1 | | 1 | | | | | | |
| ECC 9 | 1 | | | | 1 | 1 | | 1 | | | | 1 | | | | |
| ECC 10 | 1 | 1 | | | | 1 | 1 | 1 | 1 | | | | | | | |
| ECC 11 | 1 | | | | | | | | | | 1 | | | | | |
| ECC 12 | | | 1 | | | | | | | | | | 1 | 1 | | |
| ECC 13 | | | | | | | | | 1 | | | | 1 | | 1 | 1 |
| ECC 14 | | 1 | | 1 | | | | | | | | | | | | |
| ECC 15 | | | | | | | | | | | | 1 | | | | 1 |

8. The apparatus of claim 7 and further including a syndrome decode circuit comprising combinational logic that is configured in accordance with data contained in the table of claim 7 to identify which of said data bits and checkbits are in error.

9. The apparatus of claim 8 wherein said syndrome bits provide information indicating which, if any, family of data bits is in error, and which bits in said indicated family are in error.

10. An apparatus as set forth in claim 1 further comprising a syndrome decode circuit to decode said syndrome bits to identify which bits of said data word are in error, said syndrome decode circuit comprising:
   a first parallel network of gates to indicate whether there is an error occurring on any 4 familial bits of said data word,
   a second parallel network of gates to indicate whether there is an error occurring on any 4 familial bits of the check bits.

11. The apparatus of claim 10 wherein said second parallel network produces a single error bit output if any of the bits of said parallel network indicate an error occurred.

12. Apparatus for detecting and correcting errors in a 128 bit data word stored in a RAM memory comprised of multiple 4-bit wide RAMs, said apparatus comprising:
   a check-bit generator to generate check bits on said data word to detect all possible familial errors occurring within any four bits of said data word that are stored within a same one of said RAMs, to detect all double-bit errors occurring on said word, and to detect multiple uncorrectable errors occurring on said word;
   a syndrome generator to generate syndrome bits from said check bits and said 128 bit data word retrieved from said RAM memory,
   a syndrome decode and comparator circuit to decode said syndrome bits to identify any error detectable by said check bits.

13. Apparatus for detecting and correcting all 15 possible familial bit errors in a 128-bit word of data said apparatus comprising:
   a check bit generator to generate 16 check bits on said data word, said check bits to detect all double-bit errors on said data word, to detect multiple-bit uncorrectable errors on said word, and to detect and correct any familial error occurring on any combination of four bits stored within a same one of said multiple RAMs;
   a check bit regenerator to regenerate check bits from said data word after said data word is retrieved from said RAMs;
   a syndrome generator to generate syndrome bits from said regenerated check bits and said generated check bits;
   a syndrome decode and comparator circuit to identify which one or more data and check bits are in error if an error is detected.

14. A method for detecting and correcting errors on a 128 bit data word stored in a RAM memory comprised of 4-bit wide RAMs, said method comprising:
   providing 16 check bits for said data word, said check-bits to detect air double-bit errors occurring within said data word, to detect multi-bit uncorrectable errors occurring within said data word, and to detect and correct all possible combinations of familial errors occurring on bits of said data word that are stored in any one of said 4-bit RAMs;
   retrieving said data word; and
   producing a 16 bit syndrome from said data word and said check bits to identify any error that is detectable or correctable by said check bits.

15. The method of claim 14 further comprising using a determination as to which one or more errors were corrected to notify another system of a potentially bad chip.

* * * * *